(12) United States Patent
Bleicher et al.

(10) Patent No.: US 12,131,371 B2
(45) Date of Patent: Oct. 29, 2024

(54) METHOD, PLATFORM, AND DEVICE FOR PERSONALIZED SHOPPING

(71) Applicant: NIKE, Inc., Beaverton, OR (US)

(72) Inventors: David Bleicher, Tel-Aviv (IL); Tamir Lousky, Bat-Yam (IL)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/329,355

(22) PCT Filed: Sep. 6, 2017

(86) PCT No.: PCT/US2017/050281
§ 371 (c)(1),
(2) Date: Feb. 28, 2019

(87) PCT Pub. No.: WO2018/048902
PCT Pub. Date: Mar. 15, 2018

(65) Prior Publication Data
US 2019/0188784 A1   Jun. 20, 2019

Related U.S. Application Data

(60) Provisional application No. 62/383,820, filed on Sep. 6, 2016, provisional application No. 62/383,816, filed on Sep. 6, 2016.

(51) Int. Cl.
*G06Q 30/0601* (2023.01)
*G06F 16/00* (2019.01)
(Continued)

(52) U.S. Cl.
CPC ......... *G06Q 30/0643* (2013.01); *G06F 16/00* (2019.01); *G06Q 30/0613* (2013.01);
(Continued)

(58) Field of Classification Search
USPC ............................................... 705/26.1–27.2
See application file for complete search history.

(56) References Cited

U.S. PATENT DOCUMENTS

| | | | |
|---|---|---|---|
| 4,473,373 A | 9/1984 | Weiss | |
| 5,164,793 A | 11/1992 | Wolfersberger et al. | |

(Continued)

FOREIGN PATENT DOCUMENTS

| | | | |
|---|---|---|---|
| CN | 101707946 A | 5/2010 | |
| CN | 101742048 A | 6/2010 | |

(Continued)

OTHER PUBLICATIONS

Geometrix announces unique web 3D virtual try-on solution. (Oct. 23, 2000). PR Newswire Retrieved from https://dialog.proquest.com/professional/docview/444318359?accountid=161862 (Year: 2000).*

(Continued)

*Primary Examiner* — Jeffrey A. Smith
*Assistant Examiner* — Ashley D Preston
(74) *Attorney, Agent, or Firm* — Banner & Witcoff, Ltd.

(57) ABSTRACT

A system, platform, device and method are herein provided for an apparatus, system, and method to facilitate personalized online shopping. In some embodiments, a method is provided for personalized shopping that includes the steps of: running a personalized shopping assistant application on a mobile user computing device to access product matching data from one or more product data sources; running the personalized shopping assistant application on the mobile user computing device to acquire anatomical data about one or more application users, based on anatomical data capture from one or more image capture sources; running the personalized shopping assistant application generate a personalized user shopping avatar based on the anatomical data (Continued)

capture of at least a selected part of the user anatomy; and running the personalized shopping assistant application to match one or more products from the one or more product data sources to one or more personalized user shopping avatars.

20 Claims, 14 Drawing Sheets

(51) Int. Cl.
*G06Q 50/00* (2024.01)
*G06V 40/10* (2022.01)

(52) U.S. Cl.
CPC ..... *G06Q 30/0621* (2013.01); *G06Q 30/0631* (2013.01); *G06V 40/10* (2022.01); *G06Q 50/01* (2013.01)

(56) References Cited

U.S. PATENT DOCUMENTS

| | | | |
|---|---|---|---|
| 5,689,446 | A | 11/1997 | Sundman et al. |
| 6,289,107 | B1 | 9/2001 | Borchers et al. |
| 6,546,356 | B1 | 4/2003 | Genest |
| 8,065,200 | B2 | 11/2011 | Schwartz |
| 8,567,081 | B2 | 10/2013 | Smith |
| 8,655,053 | B1 | 2/2014 | Hansen |
| 8,818,883 | B2 | 8/2014 | Lawrence et al. |
| 8,868,157 | B1 | 10/2014 | Soliz |
| 8,908,928 | B1 | 12/2014 | Hansen |
| 9,345,957 | B2 | 5/2016 | Geisner et al. |
| 9,386,889 | B2 | 7/2016 | Fischer |
| 9,449,343 | B2 | 9/2016 | Mayerle et al. |
| 9,462,838 | B1 | 10/2016 | Smith et al. |
| 9,477,980 | B2 | 10/2016 | Zagel et al. |
| 9,648,926 | B2 | 5/2017 | Marks |
| 9,799,064 | B2 | 10/2017 | Ohnemus et al. |
| 9,875,546 | B1 | 1/2018 | Bhole et al. |
| 9,996,981 | B1 | 6/2018 | Tran et al. |
| 10,008,040 | B2 | 6/2018 | Lam et al. |
| 10,013,803 | B2 | 7/2018 | Mach Shepherd et al. |
| 10,067,500 | B2 | 9/2018 | Hargovan et al. |
| 10,380,794 | B2* | 8/2019 | Hauswiesner ........ G06T 17/00 |
| 10,420,397 | B2 | 9/2019 | Hei et al. |
| 10,573,004 | B2 | 2/2020 | Husheer |
| 11,324,285 | B2 | 5/2022 | Hei et al. |
| 11,514,673 | B2 | 11/2022 | Lehrich et al. |
| 2002/0138170 | A1 | 9/2002 | Onyshkevych et al. |
| 2002/0140694 | A1 | 10/2002 | Sauer et al. |
| 2003/0195623 | A1 | 10/2003 | Marchitto et al. |
| 2004/0081336 | A1 | 4/2004 | Brooks |
| 2006/0004592 | A1 | 1/2006 | Faith |
| 2006/0104503 | A1 | 5/2006 | Huang et al. |
| 2007/0005174 | A1 | 1/2007 | Thomas |
| 2007/0056212 | A1 | 3/2007 | Fink |
| 2008/0040278 | A1 | 2/2008 | DeWitt |
| 2009/0051683 | A1 | 2/2009 | Goonetilleke et al. |
| 2009/0247909 | A1 | 10/2009 | Mukumoto |
| 2009/0287452 | A1* | 11/2009 | Stanley ................ G06Q 30/02 702/155 |
| 2010/0111370 | A1 | 5/2010 | Black et al. |
| 2010/0296726 | A1 | 11/2010 | Rutschmann et al. |
| 2011/0047046 | A1 | 2/2011 | Torres |
| 2011/0093344 | A1 | 4/2011 | Burke et al. |
| 2011/0298897 | A1 | 12/2011 | Sareen et al. |
| 2012/0085828 | A1 | 4/2012 | Ziegler |
| 2012/0106796 | A1 | 5/2012 | Jones et al. |
| 2012/0249741 | A1 | 10/2012 | Maciocci et al. |
| 2012/0303154 | A1 | 11/2012 | Stiernagle |
| 2013/0080289 | A1 | 3/2013 | Roy et al. |
| 2013/0095924 | A1 | 4/2013 | Geisner et al. |
| 2013/0100256 | A1 | 4/2013 | Kirk et al. |
| 2013/0114869 | A1 | 5/2013 | Hernandez Stark et al. |
| 2013/0215116 | A1* | 8/2013 | Siddique ............. G06Q 20/40 705/26.7 |
| 2013/0218721 | A1 | 8/2013 | Borhan et al. |
| 2013/0246222 | A1 | 9/2013 | Weerasinghe |
| 2013/0307851 | A1 | 11/2013 | Stark et al. |
| 2014/0035913 | A1 | 2/2014 | Higgins et al. |
| 2014/0040041 | A1 | 2/2014 | Ohnemus et al. |
| 2014/0089134 | A1* | 3/2014 | Linh ................... G06Q 20/384 705/26.7 |
| 2014/0104395 | A1 | 4/2014 | Rohaly et al. |
| 2014/0108208 | A1* | 4/2014 | Piana .................. G06Q 30/06 705/27.2 |
| 2014/0156449 | A1 | 6/2014 | Ganesan et al. |
| 2014/0180864 | A1 | 6/2014 | Orlov et al. |
| 2014/0244442 | A1 | 8/2014 | Hirsch |
| 2014/0270540 | A1* | 9/2014 | Spector ............... G06T 7/579 382/199 |
| 2014/0285646 | A1 | 9/2014 | Kahlon |
| 2014/0320529 | A1 | 10/2014 | Roberts et al. |
| 2014/0337138 | A1 | 11/2014 | Chitalia et al. |
| 2014/0358738 | A1 | 12/2014 | Ohnemus et al. |
| 2015/0012380 | A1 | 1/2015 | Bank et al. |
| 2015/0039422 | A1 | 2/2015 | Abraham et al. |
| 2015/0066707 | A1 | 3/2015 | Unger et al. |
| 2015/0066712 | A1* | 3/2015 | Altieri ................ G06Q 10/087 705/28 |
| 2015/0070351 | A1* | 3/2015 | Tarquini .............. G06T 17/20 345/419 |
| 2015/0127132 | A1 | 5/2015 | Nyong'o et al. |
| 2015/0127363 | A1 | 5/2015 | Nyong'o et al. |
| 2015/0133754 | A1 | 5/2015 | Freeman et al. |
| 2015/0154453 | A1* | 6/2015 | Wilf ..................... G06K 9/46 382/103 |
| 2015/0199816 | A1 | 7/2015 | Freeman et al. |
| 2015/0223730 | A1 | 8/2015 | Ferrantelli |
| 2015/0228084 | A1 | 8/2015 | Belyaev et al. |
| 2015/0258431 | A1 | 9/2015 | Stafford et al. |
| 2015/0328016 | A1 | 11/2015 | Summit et al. |
| 2015/0339752 | A1* | 11/2015 | Chetuparambil ......... G06F 16/24575 705/26.62 |
| 2015/0342266 | A1 | 12/2015 | Cooper et al. |
| 2015/0359461 | A1 | 12/2015 | Alfaro et al. |
| 2016/0063613 | A1 | 3/2016 | Zhao et al. |
| 2016/0071143 | A1* | 3/2016 | Pokorney ............ G06Q 30/02 705/14.43 |
| 2016/0081435 | A1 | 3/2016 | Marks |
| 2016/0093085 | A1 | 3/2016 | Ray et al. |
| 2016/0110479 | A1 | 4/2016 | Li |
| 2016/0125499 | A1 | 5/2016 | Gooch et al. |
| 2016/0180391 | A1* | 6/2016 | Zabaneh ............. G06F 16/9535 705/14.58 |
| 2016/0183879 | A1 | 6/2016 | Goldish et al. |
| 2016/0247017 | A1 | 8/2016 | Sareen et al. |
| 2016/0286906 | A1 | 10/2016 | Malal et al. |
| 2016/0350833 | A1 | 12/2016 | Andon |
| 2016/0367191 | A1 | 12/2016 | Esposito et al. |
| 2017/0004568 | A1* | 1/2017 | Radner ................ G06T 13/40 |
| 2017/0027477 | A1 | 2/2017 | Charles et al. |
| 2017/0061683 | A1 | 3/2017 | Dorin et al. |
| 2017/0076011 | A1 | 3/2017 | Gannon |
| 2017/0083971 | A1* | 3/2017 | Ray .................... G06Q 30/0269 |
| 2017/0169571 | A1 | 6/2017 | Hung et al. |
| 2017/0208245 | A1 | 7/2017 | Castillo et al. |
| 2017/0272728 | A1 | 9/2017 | Rafii et al. |
| 2017/0323299 | A1 | 11/2017 | Davis |
| 2018/0033202 | A1 | 2/2018 | Lam et al. |
| 2018/0035762 | A1 | 2/2018 | Towns et al. |
| 2018/0047200 | A1 | 2/2018 | O'Hara et al. |
| 2018/0160776 | A1 | 6/2018 | Hei et al. |
| 2018/0160777 | A1 | 6/2018 | Hei et al. |
| 2018/0182091 | A1 | 6/2018 | MacKinnon et al. |
| 2018/0218437 | A1 | 8/2018 | Rusu et al. |
| 2018/0240238 | A1 | 8/2018 | Husheer |
| 2018/0247426 | A1 | 8/2018 | Gluck et al. |
| 2018/0300445 | A1 | 10/2018 | Schouwenburg et al. |
| 2018/0300791 | A1 | 10/2018 | Ganesan et al. |
| 2019/0026954 | A1* | 1/2019 | Vats .................... G06T 13/40 |
| 2019/0028637 | A1 | 1/2019 | Kolesov et al. |
| 2019/0037134 | A1 | 1/2019 | Merati |

(56) References Cited

U.S. PATENT DOCUMENTS

| | | |
|---|---|---|
| 2019/0082794 A1 | 3/2019 | Liu |
| 2019/0130788 A1 | 5/2019 | Seaton |
| 2019/0139252 A1 | 5/2019 | Zaiss et al. |
| 2019/0188784 A1 | 6/2019 | Bleicher et al. |
| 2019/0385356 A1 | 12/2019 | Lodato et al. |
| 2020/0211170 A1 | 7/2020 | Coria Mendoza et al. |
| 2020/0311429 A1 | 10/2020 | Chen |
| 2021/0093050 A1 | 4/2021 | Lee et al. |
| 2022/0183424 A1 | 6/2022 | Nevala et al. |
| 2022/0202138 A1 | 6/2022 | Hei et al. |

FOREIGN PATENT DOCUMENTS

| | | |
|---|---|---|
| CN | 101819663 A | 9/2010 |
| CN | 201831042 U | 5/2011 |
| CN | 102200437 A | 9/2011 |
| CN | 102466472 A | 5/2012 |
| CN | 102682395 A | 9/2012 |
| CN | 103093543 A | 5/2013 |
| CN | 103597519 A | 2/2014 |
| CN | 103852130 A | 6/2014 |
| CN | 104040580 A | 9/2014 |
| CN | 104170519 A | 11/2014 |
| CN | 104699908 A | 6/2015 |
| CN | 104854623 A | 8/2015 |
| CN | 105662681 A | 6/2016 |
| CN | 106372374 A | 2/2017 |
| CN | 106942837 A | 7/2017 |
| JP | 106149376 A | 5/1994 |
| JP | 2000515088 A | 11/2000 |
| JP | 2001101272 A | 4/2001 |
| JP | 2002203167 A | 7/2002 |
| JP | 2003127994 A | 5/2003 |
| JP | 2003331108 A | 11/2003 |
| JP | 2005006905 A | 1/2005 |
| JP | 2005169015 A | 6/2005 |
| JP | 2007526028 A | 9/2007 |
| JP | 2010510587 A | 4/2010 |
| JP | 2013050937 A | 3/2013 |
| JP | 2013097799 A | 5/2013 |
| JP | 2014040231 A | 3/2014 |
| JP | 2016001360 A | 1/2016 |
| JP | 2016040649 A | 3/2016 |
| JP | 2016532197 A | 10/2016 |
| JP | 2017016356 A | 1/2017 |
| JP | 201779809 A | 5/2017 |
| JP | 2018526641 A | 9/2018 |
| JP | 2019049457 A | 3/2019 |
| JP | 2019056679 A | 4/2019 |
| KR | 20100019067 A | 2/2010 |
| KR | 20100131404 A | 12/2010 |
| KR | 20110131404 A | 12/2011 |
| KR | 20120123842 A | 11/2012 |
| KR | 20120123845 A | 11/2012 |
| KR | 20130052159 A | 5/2013 |
| KR | 20140123977 A | 10/2014 |
| KR | 20150061089 A | 6/2015 |
| KR | 20150070459 A | 6/2015 |
| KR | 20160005977 A | 1/2016 |
| KR | 20160021118 A | 2/2016 |
| TW | 201251444 A | 12/2012 |
| WO | 9748027 A1 | 12/1997 |
| WO | 2005006905 A1 | 1/2005 |
| WO | 2012072844 A1 | 6/2012 |
| WO | 2013026798 A1 | 2/2013 |
| WO | 2014159726 A1 | 10/2014 |
| WO | 2016051416 A1 | 4/2016 |
| WO | 2017127132 A1 | 7/2017 |
| WO | 2017220638 A1 | 12/2017 |
| WO | 2018048902 A1 | 3/2018 |
| WO | 2018109421 A1 | 6/2018 |

OTHER PUBLICATIONS

Ph. Guerlain, & Durand, B. (2006). Digitizing and measuring of the human body for the clothing industry. International Journal of Clothing Science and Technology, 18(3), 151-165. doi:http://dx.doi.org/10.1108/09556220610657925 (Year: 2006).*
Nov. 16, 2017—ISR & Written Opinion for PCT/US2017/050281.
Oct. 1, 2018—(WO) ISR & WO—App. No. PCT/US18/039781.
Jul. 9, 2019—(WO) ISR & WO—App. No. PCT/US19/014958.
May 24, 2018—(WO) ISR & WO—App. No. PCT/IB18/050041.
Anonymous: "How to Calculate Height of Android Phone from ground—Stack Overflow". Aug. 17, 2017 (Aug. 17, 2017), XP055836361, Retrieved from the Internet: URL:https://stackoverflow.com/questions/17443936/how-to-calculate-height-of-android-phone-from-ground [retreived on Aug. 31, 2021].
"GPA gait posture assessment", <<https://blog.naver.com/doveman/220777337061>>, Aug. 2, 2016, 14 pages.
Heat map definition, Google (Year: NA).
A brief history of GPS, Mark Sullivan, 2012 (Year: 2012).
Dec. 4, 2017 (WO) International Search Report—PCT/US2017/0 , 12 pages.
"Accu Foot size", Accu foot size app review, Retrieved from the internet <URL https://www.apkmonk.com/app/com.accufootsize/>, 20157, 7 pages.
Mar. 29, 2018 (WO) International Search Report received for PCT Patent Application No. PCT/US2017/065878, 16 pages.
Nov. 19, 2018 (JP) Office Action received for Japanese Patent Application No. 2018-502047, 4 pages (Official Copy only)(See Communication under 37 CFR §v1.98(a)(3)).
Ganesan, Anand, "Footwear Virtual Fitting Service for E-Commerce & Physical Stores", findmeashoe.com, Jul. 2018, 27 pages.
Jun. 27, 2018 (WO) International Preliminary Report on Patentability received for PCT Patent Application No. PCT/US2017/065878, 13 pages.
Xu, et al. "A personalized assistant in 3D virtual shopping environment," 2010 Second International Conference on Intelligent Human-Machine Systems and Cybernetics, vol. 2, IEEE, 2010, 4 pages.
Schmeil, Andreas, et al., "MARA—A Mobile Augmented Reality-Based Virtual Assistant," Mar. 10, 2007, IEEE Virtual Reality Conference (Year: 2007).
Brykman, Steven, "Get Ready! The Humanoid AR Assistants are Coming," Oct. 18, 2017, medium.com: Interactive Mind (Year: 2017), 7 pages.
Yang, Yu-I, et al., "A virtual try-on system in augmented reality using RGB-D cameras for footwear personalization," Oct. 2014, Journal of Manufacturing Systems vol. 33, Issue 4 (Year: 2014), 9 pages.
Merriam-Webster Dictionary definitions of "augmented reality," "superimpose," & "real time," as referenced in Response to Arguments, retrieved from merriam-webster.com via Internet Archive, dated 2013-2014 (Year: 2014).
M. Yuan, et al., "A Mixed Reality Virtual Clothes Try-On System," in IEEE Transactions on Multimedia, vol. 15, No. 8, pp. 1958-1968, Dec. 2013, doi: 10.1109/TMM.2013.2280560 (Year: 2013).
Kabir, et al., Review Paper, "Mobile Apps for Foot Measurement: A Scoping Review," arXiv e-prints, Sep. 2020 (Year: 2020), 25 pages.
Domina, Tanya, et al., "Thermal pattern variations analyzed using 2D/3D mapping techniques among females," Journal of Textile and Apparel, Technology and Management 7.1. (Year 2011).
Kimura, Takato, et al., "Automatic Crack Detection in Infrastructure Inspection Using Fully Convolutional Network," received Aug. 27, 2017, vol. 11, No. 1, Mar. 12-20, 2018, 2018 Information Processing Society of Japan, 10 pages.

* cited by examiner

METHOD, PLATFORM, AND DEVICE FOR PERSONALIZED SHOPPING

CROSS-REFERENCE TO RELATED APPLICATIONS

This application is a U.S. National Stage application under 35 U.S.C. § 371 of International Application PCT/US2017/050281 (published as WO 2018/048902 A1), filed Sep. 6, 2017, which claims the benefit of priority to U.S. Provisional Patent Application No. 62/383,816 filed on Sep. 6, 2016, entitled "SYSTEM, PLATFORM AND METHOD FOR PERSONALIZED SHOPPING", and U.S. Provisional Patent Application 62/383,820 filed on Sep. 6, 2016, entitled "SYSTEM, PLATFORM AND METHOD FOR PERSONALIZED SHOPPING USING A REMOTE USER MOBILE DEVICE". Benefit of the filing date of each of these prior applications is hereby claimed. Each of these prior applications is hereby incorporated by reference in its entirety.

FIELD OF THE INVENTION

The present invention relates in general to methods, applications and devices useful in personalized product shopping and manufacture.

BACKGROUND OF THE INVENTION

Today, most marketplaces are moving strongly forward to the online market, however when it comes to products requiring accurate fitting, this has posed many challenges. For one thing, when fitting is a critical element of the shopping, consumers have been relatively hesitant to migrate to online shopping, considering the difficulty of appropriately fitting on products remotely.

Online shopping offers many upsides to the customer, including endless variety, the possibility to compare prices, and perform the browsing and purchasing without physically going to the shop. Over the past few years, many companies have begun offering their customers the option of customizing their products before purchasing online. Common customizations include choice of colour and material, and in some cases, custom size and fit. In order to implement these changes, sellers of products need to integrate software and hardware solutions for digital manufacturing.

Additionally, online merchants have been offering free return postage in order to make it easy for users to purchase online. However, when it comes to products requiring fitting, considering the many challenges, the return rate is typically high, thereby leading to substantial time, resource and expense costs for online merchants, making such shopping increasingly unsustainable.

It would be highly advantageous to have a system or method that could enable highly accurate and user friendly online fitting solutions.

SUMMARY OF THE INVENTION

There is provided, in accordance with an embodiment of the present invention, an apparatus, system, and method to provide personalized online product fitting, according to some embodiments.

A method for personalized shopping is provided that includes the steps of: running a personalized shopping assistant application on a mobile user computing device to access product matching data from one or more product data sources; running the personalized shopping assistant application on the mobile user computing device to acquire anatomical data about one or more application users, based on anatomical data capture from one or more image capture sources; running the personalized shopping assistant application generate one or more personalized user shopping avatars based on the anatomical data capture of at least a selected part of the user anatomy of one or more application users; and running the personalized shopping assistant application to match one or more products from the one or more product data sources to one or more personalized user shopping avatars.

In further methods, the personalized shopping assistant application further accesses user history data.

In further methods, the personalized shopping assistant application further accesses user preference data.

In further methods, a simulation is provided that represents one or more anatomical characteristics of the user.

In further methods, one or more products may be simulated on at least a part of the personalized shopping avatar in the personalized shopping assistant application.

In further methods, a personalized product recommendation is generated.

In further methods, a customized product may be ordered.

In further methods, product matching feedback may be provided from a social network.

In further methods, a product selection may be modified based on the product matching feedback.

In further methods, a virtual try-on feature may be run on the mobile user computing device.

In further methods, a virtual simulation may be generated for one or more products based on the personalized shopping avatar.

In further methods, the personalized shopping avatar may be modified in accordance with changes in one or more of user anatomical, user anatomy, user behavior, user history, user preferences, and social feedback.

In further methods, the user preferences are selected from the group consisting of size, color, style, price, material and type preferences.

In further methods, anatomical data may be captured from one or more sensors on one or more user mobile communication devices.

A platform for personalized shopping is provided that includes: a cloud based server including a profile module for generating a personalized shopping avatar based at least partially on anatomical profile data for multiple users, a product module for consolidating product data for multiple products, and a product matching module adapted to run code to match one or more products to one or more shopping avatars; and a personalized shopping assistant application running on a mobile user computing device, the mobile device including a camera to enable anatomical profile data capture of a user to be used in generating the personalized shopping avatar for one or more users, the mobile device communicatively connected to the cloud based server, and, wherein image capture data and anatomical profile data are communicated to the cloud server; wherein the personalized shopping assistant application runs code to generate at least a part of the user personalized shopping avatar based on the capture of at least a part of the user anatomy.

In further embodiments, the end user shopping assistant application further includes a personalized product ordering module to generate personalized product recommendations In further embodiments, the end user shopping assistant application further includes a personalized product ordering module.

In further embodiments, the end user shopping assistant application is adapted to present a simulation that graphically represents one or more anatomical characteristics of the user.

In further embodiments, the end user shopping assistant application further includes a product customization module to dress one or more products on one or more personalized shopping avatars.

In further embodiments, the end user shopping assistant application further includes a social shopping module.

In further embodiments, the end user shopping assistant application further includes a personalized product fitting module.

A mobile device for personalized shopping is provided that includes: a touch screen configured to receive a user's input; a device camera to capture multiple images of at least a part of a user anatomy; a processor having registers adapted to analyze one or more images of the user's anatomy and product data; and a software application running on the mobile device, to generate a graphic simulation of a personalized user shopping avatar based on the analysis of multiple images of at least a part of the user anatomy, wherein the processor retrieves information from the registers, and writes information to the registers, and wherein the processor is configured to match a shopping avatar with external product data to generate a personalized product offering.

In further embodiments, the mobile device includes registers adapted to analyze one or more user history data and user preference data.

In further embodiments, the mobile device includes a depth sensor configured to provide 3D data that enables enhanced generation of a user anatomical profile.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The term "fitting" as used herein refers to trying on a product, seeing a product tried on, modifying the product to a particular person's body or other physical parameters. The term "avatar" refers to an embodiment, personification, icon, model or figure representing a particular person, in particular, to represent a person on screen.

Non-limiting embodiments of the present invention include a system, platform, device and method for facilitating highly personalized shopping, whether online and/or in-store, including effective virtual fitting-on of products. In some embodiments, systems, platforms and methods are provided for enabling manufacturing of personalized products.

Figure 1A:
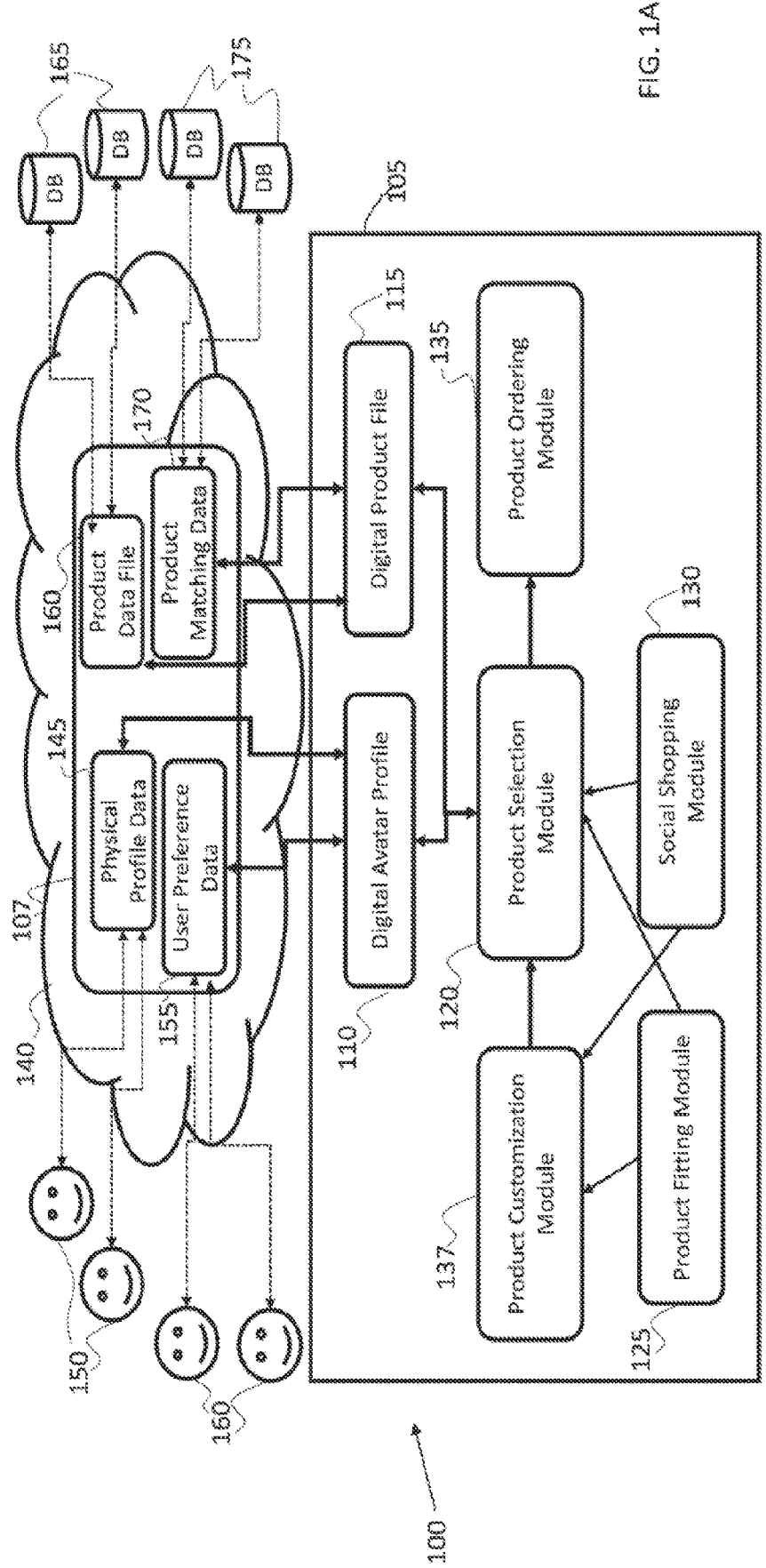
FIG. 1A is a schematic system diagram depicting a system and platform for facilitating personalized shopping, according to some embodiments.

Reference is now made to FIG. 1A, which is a schematic system diagram depicting a system 100 for facilitating personalized shopping, according to some embodiments. As can be seen, personalized shopping system 100 includes a platform 105 for personalized shopping profile management, which may include a digital avatar profile module 110, a digital product file module 115, a product selection module 120, a product fitting module 125, a social shopping module 130, a product ordering module 135 and a product customization module 137.

Platform 105 is in communication with a personalized shopping server 107, via communications cloud 140, which may include or connect to a physical profile data module 145, which is communicatively connected to users 150, providing physical user data, for example, from 2D and/or 3D scans or other digital measurement sources. Personalized shopping server 107 may include or connect to a user preference data module 155, which is communicatively connected to users 160, providing user preference data. Personalized shopping server 107 may include or connect to a product file data module 160, communicatively connected to multiple product databases 165, and product matching data module 170, which includes one or more product matching algorithms, and is communicatively connected to product databases 175.

As can be seen, digital avatar profile 110 is highly personalized, constructed from various data sources, whether directly or indirectly from a user, and whether representing physical characteristics and/or mental, emotional, psychological characteristics. Digital avatar profile 120 generally includes a file or group of files and data points from which instructions can be executed to enable the generation of a high-resolution user profile or avatar from one or more data sources. Further, product selection module 120 generally matches up personalized avatar profile 110 with selected digital products, whether online or offline. The calculations for the matching algorithm may be performed by a processor through storage, retrieval and processing of data. In some embodiments one or more device registers may be used, wherein the register(s) refers to one of a small set of data holding places that are part of a computer processor, for holding a computer instruction, a storage address, or any kind of data. The matching algorithm, in some embodiments, may include running code to provide perfect or close to perfect matches between product types, sizes, styles etc. provided by a product database, and the physical parameters and/or user preference data as defined by the user Avatar profile, based at least on a scan of at least a part of the user's body that relates to the user's profile. For example, user A may have a foot profile that is defined by a size, width, and depth. Further the user's profile may include preference data such as preferred styles, shoe types and colors, such as a blue or grey athletic shoe. The Product database may include, for example, an athletic shoe is colors blue, grey and blue-grey, in the precise or close enough to the user's size, width and depth. In this case, the matching algorithm will match the profile definitions with the one or more products from the product database that match the user profile.

Product selection module 120 may be further refined by providing system feedback and product fitting data using product fitting module 125, as well as social shopping data from social shopping module 130. Product fitting module, in some embodiments, includes a means for feedback from a shopping assistant or supporter that is with the shopper. In other embodiments, product fitting module includes a means for feedback from a virtual shopping assistant or supporter, for example, a communicatively connected supporter, a digital or virtual mirror or screen showing the user with the product. Further, product customization module 137 may receive data from product fitting module 125 and/or social shopping module 130, to help further personalize the product being considered for acquisition in accordance with the digital avatar and the product fitting module 125 and/or social shopping module 130. Product customization module 137 may enable a user to change or customize the product being tried on or tested, for example, by changing product colors, shape, design, size, materials etc. In this way, the product to be ordered may be constructed in accordance with user specific or customized requirements. Further, the Product customization module 137 may send to the product selection module 120 the customized product as chosen or generated by the user, after which the product selection module 120 may initiate the ordering of the customized product, via the product ordering module 135. Moreover, user updates embodied in the user's changes made in product selection module 120 may be used to update the digital avatar profile 110, thereby keeping the user avatar profile updated, for example, to user body changes, preference changes, etc.

Product selection module 120 includes a file or group of files and data points from which instructions can be executed to execute commands to enable the matching of high resolution user profiles or avatars to products that have a high level of fit to the shopping research being performed by each system user. This module may further integrate the feedback generated in the system modules to constantly improve the accurate product recommendation it provides. Using a variety of technical procedures that are performed on the avatar, such as integrating volume, cross section area and circumferences as well as length, width, height and additional distances, the system may represent the avatar in an array of representing numbers. This array of numbers, in some embodiments, may represent the various elements of the avatar, to allow for comparison to similar elements of the products to be tried on by the avatar. Accordingly, when the avatar data, which may be enhanced using recommendation algorithms and machine learning techniques etc, is compared to the product data from the product file, this may allow for an accurate, constantly improving, personalized product recommendation from the system.

According to some embodiment, digital avatar profile can be generated with relatively Low-level integration of 3D scanners. In some examples sensors or scanners that may be used may include structured light, time-of-light, photogrammetry, or any other type of 3D and/or 2D scanning technology. Suppliers of such technology, include, but not limited to, are PrimeSense™ based scanners, Occipital Structure Sensors, 3D-Systems Sense and iSense™ sensors, Intel™ RealSense sensors (stand alone or machine integrated), Scanning Platforms based on iPad s or tablets, PC (Integrated and External), Android+RealSense (Next generation) devices, and Google project Tango devices etc.

Figure 1B:
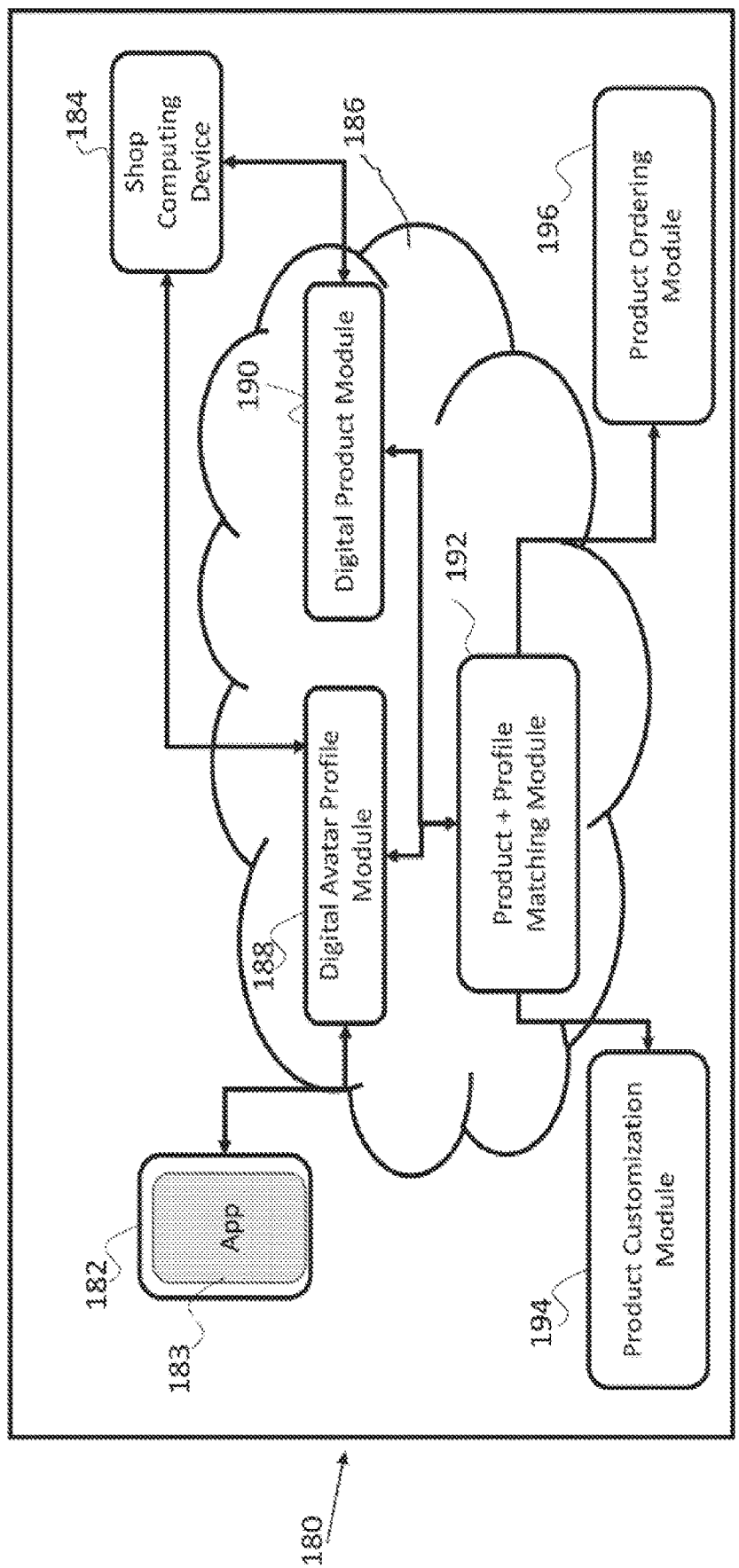
FIG. 1B is a schematic system diagram depicting a platform for facilitating personalized shopping, according to some embodiments.

Reference is now made to FIG. 1B, which is a schematic system diagram depicting a platform 180 for facilitating personalized shopping, according to some embodiments. As can be seen, personalized shopping platform 180 includes one or more user mobile devices 182, such as smartphones or tablets, including, without limitation, a camera, application and data connectivity, which runs a personalized shopping assistant application 183; optionally a shop or point of sale computing device 184, typically at or near a shop, for example an electronic device with a depth camera, Application, and data connectivity; where mobile device(s) 182 and computing device(s) 184 connect to the communications cloud 186. Communications cloud 186 includes a digital product module 190, for holding, consolidating and otherwise managing data for multiple products; a digital Avatar profile module 188, for holding, consolidating, processing and otherwise managing profile data for multiple users; and matching module 192, for matching product and avatar profile data, to assist in enabling product recommendations and other matching functions. Platform 180 further includes a product customization module 194, for enabling ordering of customized products based on matching module output and or user choices; and Product ordering module 196, for enabling ordering of products based on the based on matching module output and or user choices.

Figure 2:
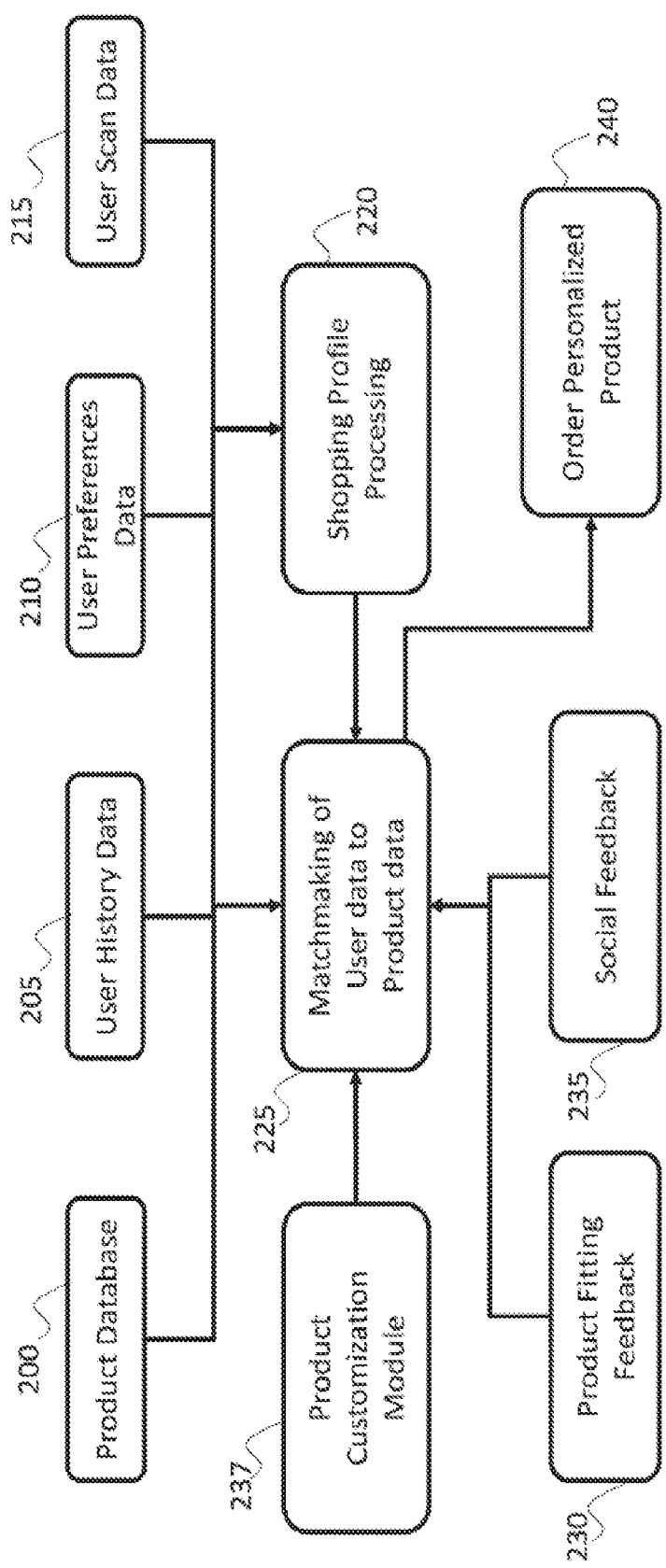
FIG. 2 is a flow diagram indicating a process of facilitating personalized shopping, according to some embodiments.

Reference is now made to FIG. 2, which is a is a flow diagram indicating a process of facilitating personalized shopping, whether online or offline, according to some embodiments. As can be seen, product information from a product database 200 may be used for products to be discovered, purchased or manufactured. At step 205 history data for a user may be retrieved, for example, based upon previous user purchases and research. At step 210 user preference data may be acquired, such as size, color, material, type preferences etc. At step 215, scanned or graphic data may be acquired for a user, for example, from standard digital photographs, 2D and/or 3D image scanning etc. This graphic data is used by the personalized shopping system to generate a user's physical profile based on the user's physical properties. At step 220 a multi-dimensional user shopping profile, hereinafter referred to as a user shopping avatar, may be developed, by processing the various input data from steps 205, 210 and 215, thereby generating a personalized user shopping avatar or profile that includes user physical or anatomical properties, and optionally user behavior and user preference data. The profile or avatar is a dynamic structure which may constantly improve in the way it animates, reflects or represents the user, optionally using feedback and additional inputs from steps 205, 210, and/or 215. In one implementation, a user avatar may be used to match a user to potential products, in a single store, and/or in multiple stores, for example, in any retail store in a chain of stores, or online, in a network or affiliation of online and/or offline stores or platforms.

At step 225, a matchmaking of the user shopping profile to products being researched or required is executed. At this step, the product data from product database 200 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences. The step of matching may be complemented by a provision of recommendations for the user, based on the above user profile to product matchmaking process.

At step 230 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to virtually try on the product being researched, such that the users may see themselves dressed in the product in accordance with a digital simulation that places the product onto the user shopping avatar. In some cases, the system may provide a static or dynamic high resolution visual output such as an animated avatar or character, rendered pictures and/or visual representation of the recommendation, optionally fitted on the avatar. For example, such a rendition may allow the user to see the product being tried on to be depicted on the avatar, thereby helping the user to visualize details such as fit, tightness, color, style, material etc., according to color heat maps etc. For example, color heat maps may be used to indicate areas of tightness, tension, friction etc. when the product interfaces with the body. As above, the user may use the shopping Avatar to provider further feedback to modify the user's shopping profile. At step 235 feedback may be acquired from social networks or direct third-party feedback to which a user is connected, to help modify the user shopping profile.

At step 237, product customization may integrate data from product fitting feedback at step 230 and/or social feedback at step 235, to help further personalize the product being considered for acquisition in accordance with the digital avatar and the product fitting module 125 and/or social shopping module 130.

At step 240, a personalized product may be ordered by a user, whether inside a physical store or an online store. Further, a personalized product may be ordered from a manufacturer who may produce a product based upon the user's request such that the product is a once-off customized product for a user. The custom products may include, for example, various types of customization including material type, print samples, color, size, volume, angles, model variation, styles. Personal tailoring etc.

Figure 3:
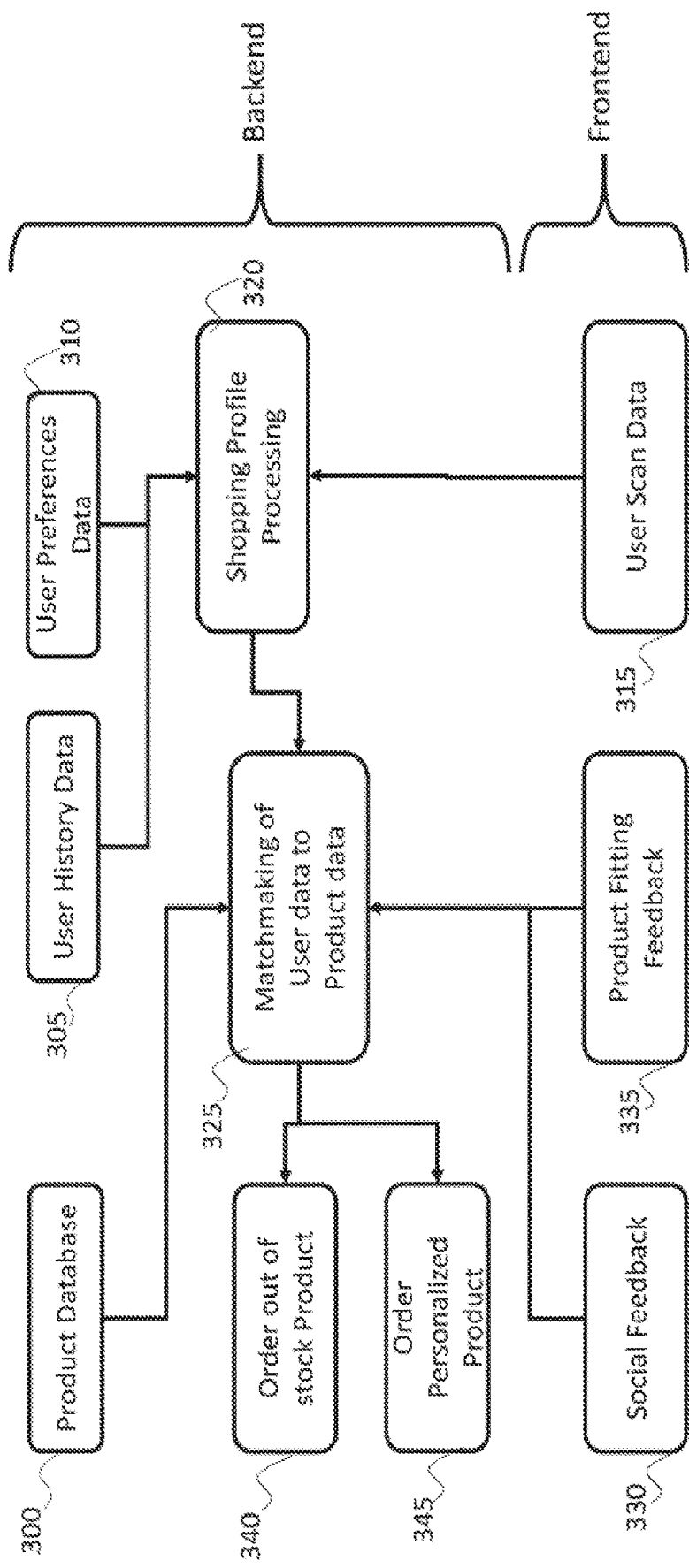
FIG. 3 is a flow diagram for facilitating a personalized in-store shopping experience, according to some embodiments.

Reference is now made to FIG. 3, which is a flow diagram for facilitating a personalized offline (in the store) shopping experience, according to some embodiments. As can be seen, at the backend or computing system supporting a physical store, product information from a product database 300 may be used for products to be discovered, purchased or manufactured by an online user. In some embodiments product database is associated with a product data processing module, which is adapted to perform high intensity calculations on the local point-of-sale device and/or on the cloud, depending on the embodiment type and requirements. At step 305 history data for a user may be retrieved, for example, based upon previous user purchases in a store or chain of stores. At step 310 user preference data may be acquired, such as size, color, material, type preferences etc. At step 315, at the frontend or user side, scanned or graphic data may be acquired for a user, for example, from standard photographs, 2D and/or 3D image scanning etc. In some embodiments a dedicated or generic application on a smart phone, tablet or other computing device may be used to enable effective photographing or scanning of a user. In further embodiments, a dedicated or generic camera or scanning device, kiosk or standing station (moving or static) may be used by a shopping assistant, helper, sales person and/or associate. At step 320, this geometrical data is used by the personalized shopping system, together with the various input data from steps 305 and 310, to generate a multidimensional user shopping avatar or profile that includes user physical properties as well as user behavior and user preference data.

At step 325, a matchmaking of the user shopping profile to products being researched or required is executed. At this step, the product data from product database 300 is matched to products being requested by a user, in accordance to the specific user shopping profile. The step of matching may be complemented by a provision of recommendations for the user, based on the above user profile to product matchmaking process, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and the shopper themselves. This also allows for users to benefit from matching and recommendation data, which was generated for other avatars or users, which may share similar features, optionally in an anonymized manner, thus enabling a smarter and more accurate matching and/or recommendations.

At step 330 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. At step 335 feedback may be acquired from the users, using an active and/or passive approach. For example, active entry of feedback may occur when the system receives actual feedback about the fit (e.g., good/bad/off by how much) or other aspects, whether from a present person or people and/or a remote person or people. Such feedback may allow a user to, for example, enter selected choices into the system, for example, via a box or text entry element where the user may enter a selected size, type or other preference. Passive feedback may occur when the system receives actual feedback about the fit or other aspects, originating from sales information, returns, etc., or by trying on certain types, colors, sizes etc., enables the system to learn from the user's past choices and behavior, to further improve the personal avatar as well as the product information and fit for other users. In some cases, advanced graphic processing and 3D rendering may be used for the user to try on the product being researched, such that the user may see themselves virtually dressed in the product in accordance with a digital simulation that places the product onto the user shopping avatar. As above, the user may use the shopping Avatar to provider further feedback to modify the user's shopping profile.

At step 340, a personalized product may be ordered by a user from a physical store, for example, for a product that is in principle available but not currently in the store, or to enable manufacturing of a specifically required product based upon the user's shopping avatar, such that the product is a once-off customized product for a user.

At step 345 the user can select a personalized product and/or modify or design a product, optionally based on a product which s/he has seen, liked and chosen in the store, to purchase a custom product which will be created and/or manufactured for her/him. These modifications may include visual changes, such as name engraving, colors, materials, prints etc., as well as physical properties, such as controlling the height of the heels in shoes, the thickness of a frame in eyewear etc. At steps 340 and 345, these features may allow the in-store customers to enjoy features that are typically limited to eCommerce and online shopping.

Figure 4:
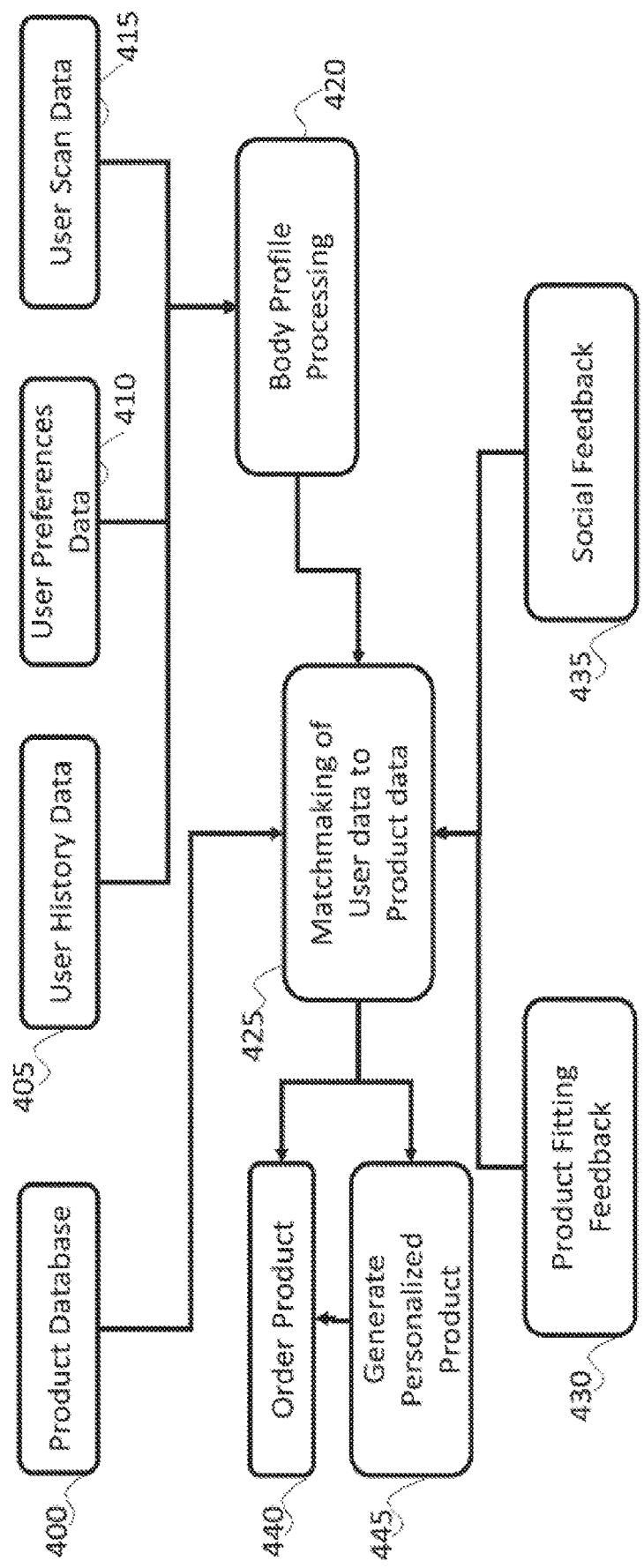
FIG. 4 is a flow diagram for facilitating a personalized online shopping experience, according to some embodiments.

Reference is now made to FIG. 4, which is a flow diagram for facilitating a personalized online shopping experience, according to some embodiments. As can be seen, an online store may acquire product information from a product database 400, for a selection of products to be offered to online users. At step 405 history data for an online user may be retrieved, for example, based upon previous user purchases and research. At step 410 user preference data may be acquired, such as size, color, material, type preferences etc. At step 415, scanned or graphic data may be acquired for a user, for example, from standard photographs, 2D and/or 3D image scanning etc. In some embodiments a dedicated or generic application on a smart phone, tablet or other computing device may be used to enable effective photographing or scanning of a user. In other embodiments a webcam, 3D camera, video recorder etc. may be used to acquire scanned or graphic data. At step 420, this graphic data is used by the personalized shopping system, together with the various input data from steps 405, 410 and 415, to generate a multidimensional user shopping avatar or profile that includes user physical properties as well as user behavior and user preference data.

At step 425, a matchmaking of the user shopping profile to products being researched or required is executed. At this step, the product data from product database 400 is matched to products being researched by a user, in accordance to the specific user shopping profile, thereby enabling advanced recommending of product matches, for example, to aid filtering out of non-appropriate products for the specific user, and the advanced matching up of appropriate products, in accordance with the specific user's personal shopping profile and preferences.

At step 430 product fitting data from feedback of remote people, such as family members, friends or shopping assistants connected via a smart phone or computer for example, may be used to help modify the matchmaking of user data to product data, for example, to include data relating to which colors look good on a person or which size looks best etc. may be used by the user to update their shopping profile. In further examples, code may be used to provide product color recommendations, size or fit recommendations etc. This feedback may be collected actively from the user or statically, for example based on the purchase information, shipping and return shipping data etc. At step 435 feedback may be acquired from social networks or to which a user is connected, to help modify the user shopping profile. In addition, a human and/or machine based digital representative, style expert and/or additional guiding information may be inputted to improve the guidance and support provided to the shopper in the online purchase process. In some cases, advanced graphic processing and 3D rendering may be used to enable the user to virtually try on the product being researched, such that the user may see themselves dressed in the product in accordance with a digital simulation that places the product onto the user shopping avatar. This may be done using real-time simulation, allowing for a live stream of animated video or high-resolution images of the simulation etc. The "digital try-on", in some embodiments, may include a physics simulation to include the exact positioning of the element on the avatar in movement on in a static position. As above, the user may use the shopping Avatar to provider further feedback to modify the user's shopping profile.

At step 440, a product may be ordered by a user from an online store. Optionally, at step 445, a personalized product may be generated by a user from an online store, to enable manufacturing of a specifically required product based upon the user's shopping avatar, such that the product is a one-off customized product for a user. The shopping system, in case of a custom manufacturing output, may if needed, connect directly to the company production hardware and ERP system to facilitate such personalized product manufacturing. in one example, the personalized product may be represented in 3D printer files such as STL models or digital cutting devices, such as DXF or DWG files. In other embodiments, this could be a custom routing card or production instruction and BOM files. Additional input may include be visual renders that will help a product manufacturer or printer to visually design the custom product.

In some embodiments, the data from product database 400 may be used, together with the body or avatar profile derived in step 420, to develop a customized product at step 445, optionally without product matchmaking at step 425.

Figure 5:
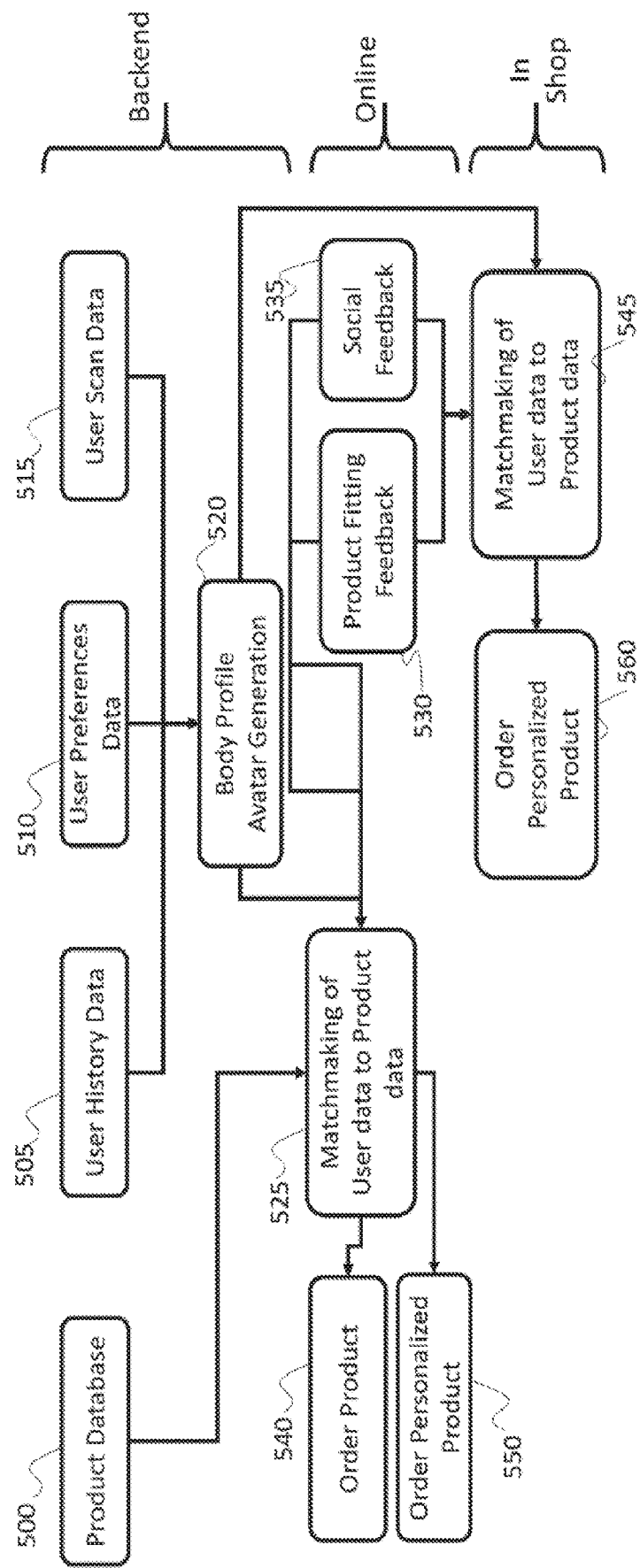
FIG. 5 is a flow diagram indicating an example of personalized hybrid shopping experience, according to some embodiments.

Reference is now made to FIG. 5, which is a flow diagram indicating an example of personalized hybrid shopping experience, according to some embodiments. As can be seen in the figure, at the backend or computing system supporting a physical and/or online store, product information from a product database 500 may be used for products to be discovered, purchased or manufactured by an online or in store user. At step 505 history data for a user may be retrieved, for example, based upon previous user purchases in a store or chain of stores, whether from online and/or in store experiences. At step 510 user preference data may be acquired, such as size, color, material, type preferences etc. At step 515, at the frontend or user side, whether executed by the user or by a shopping assistant, scanned or graphic data may be acquired for a user, for example, from standard photographs, 2D and/or 3D scanning etc. In some embodiments a dedicated or generic application on a smart phone, tablet or other computing device may be used to enable effective photographing or scanning of a user. In further embodiments, a dedicated or generic camera or scanning device may be used by a shopping assistant, which may include portable or non-portable devices, kiosk type or stand-alone devices. At step 520, this graphic data is used by the personalized shopping system, together with the various input data from steps 505, 510 and 515, to generate a multidimensional user shopping avatar or profile that includes user physical properties as well as user behavior and user preference data. One advantage of this system is the seamless transfer in which the users can transition between online and offline shopping, while enjoying the benefits of personalization, using a constantly updated personal profile in the online and/or in-store scenarios.

In some embodiments, at step 525, a matchmaking of the user shopping profile to products being researched or required is executed, for an online shopping optionally located in a physical store. At this step, the product data from product database 500 is matched to products being requested by a user, in accordance to the specific user shopping profile, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and/or the shopper themselves.

At step 530 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. At step 535 feedback may be acquired from social networks or to which a user is connected, to help modify the user shopping profile. In some cases, advanced graphic processing and 3D rendering may be used for the user to virtually try on the product being researched, such that the user may see themselves dressed in the product in accordance with a digital simulation that places the product onto the user shopping avatar. As above, the user may use the shopping Avatar to provider further feedback to modify the user's shopping profile.

At step 540, a product may be ordered by an online user in a physical store. At step 550, a personalized product may be ordered by an online user in a physical store, for example, for a product that is in principle available but not currently in the store, or to enable manufacturing of a specifically required product based upon the user's shopping avatar, such that the product is a once-off customized product for a user.

In some embodiments, at step 545, a matchmaking of the user shopping profile to products being researched or required is executed, for user located in a physical store. At this step, the product data from product database 500 is matched to products being requested by a user, in accordance to the specific user shopping profile, thereby enabling advanced filtering out of non-appropriate products for the specific user, and the advanced matching up of appropriate products, in accordance with the specific user's personal shopping profile and preferences. This advanced filtering enables a shop salesperson, for example, or the user themselves, to be presented with substantially appropriate products, optionally products that are currently available, rather than have the user select items that are non-appropriate, thereby wasting time and resources of shopping assistants and/or the shopper themselves.

Figure 6:
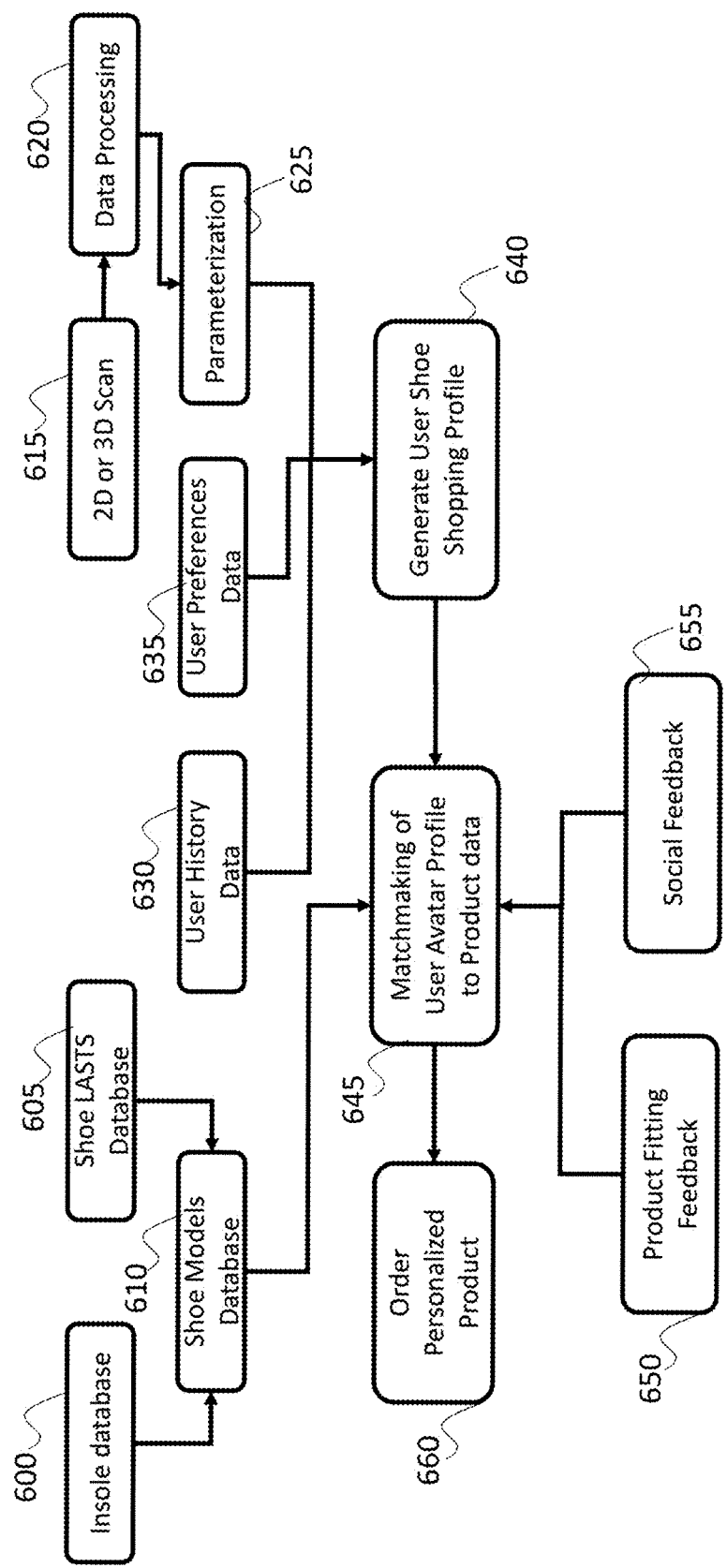
FIG. 6 is a flow diagram indicating an example of personalized shoes shopping, online or offline, according to some embodiments.

Reference is now made to FIG. 6, which is a flow diagram indicating an example of personalized shoes shopping, online or offline, according to some embodiments. As can be seen in the figure, insole information from an insoles product database may be acquired at 600. In addition, shoe last information from shoe lasts product database may be acquired at 605. In some cases, inner sole data, shoe last data and/or shoe model data may include data about each product's shape, volume, materials of shoes, closure type, shoe type, width, length, height, thickness, elasticity of materials, comfort fit etc. In some examples, mesh analysis and digitization may be provided, for example, to run a mesh analysis of each 3D last, combined with 2D DXF data, to be added to shoe last database 605. In addition, shoe model data for shoes to be discovered, purchased or manufactured may be acquired from shoe models database 610. In some cases, for example, 3D STL files may be imported for shoe lasts, and 2D DXF files may be imported for last bottoms.

At step 615, scanned or geometrical data may be acquired for a user, for example, from standard photographs, 2D and/or 3D image scanning etc. This graphic data may be processed at 620, by the personalized shopping system, over the cloud or in the unit itself, in order to generate a user's physical profile based on the user's physical properties. The profile may include all or some of the following attributes: a 3D mesh including the exact geometry of the profile, a 3D mesh including the exact geometry of one or more parts of the user's body, 2D images, properties calculated from one or more of the input methods, including specific volumes, cross section measurements, specific distances and lengths, as well as non-numeric attributes such as preferences etc. For example, a user's foot or both feet together may be pictured or scanned while standing on the floor or on another other surface, on or near a reference object, etc. Further, the user's foot or feet may be scanned by the camera scanning around the different angles of the feet, or by the person moving around the camera, thereby generating a 3D model, a movie or a series of pictures as reference. The scanned data may typically be processed, optionally including interpolation and/or cleaning, to allow for object identification and mesh generation, or other suitable processing means. In some cases, meshing may further enable removal of excess geometries and/or fixing of mesh errors, for example, including separation, identification and preparation of each of the feet, removal of the floor, pants or other excess materials from the scans etc. Scanned data processing may, in some cases, allow for feet alignment, which also helps separation or individualization of the two feet, to provide accurate measurement of both feet, including dimensional analysis to determine general and area specific lengths, width and height, and Cross-sectional analysis to determine area, perimeter, and other dimensions at specific cross sections. Scanned data processing may allow for smoothing of the edges of the scanned feet, building of missing volumes, constructing of the soles of the feet etc. In some cases, full foot volume and/or area specific volume may be extracted from the model as additional information. At step 625 the processed user scanned data may be parameterized, for example, to extract precise length, width, height, arch, ball, cross section, circumferences and volume dimensions etc. These parameters may be calculated off the clean 3D mesh using specific algorithms. For example, the calculation of the foot arch height off a model that was scanned in the standing position is complex and may be based on comparison of XYZ parameters of various anatomical parts throughout different cross sections in the center of the foot. The width of the foot may be calculated based on the volume of the toe box calculated both at a 3D mesh and 2D cross section level. The length of the foot may be calculated from a combination of the total length and the "ball length" which represents the distance between the heel of the foot and the Pt metatarsal. In addition, user specific conditions, such as sores, infections, damage etc. can also be identified and integrated into the user's shoe shopping profile. At this step, the pronation or supination condition of the foot may also be analyzed. Additionally, the arch of the foot may be identified and measured for fitting of support insoles or other prosthetics.

At step 630 history data for a user may be retrieved, for example, based upon previous user purchases in a store or chain of stores, whether from online and/or in store experiences. At step 635 user preference data may be acquired, such as size, color, material, type preferences etc. At step 640 a multi-dimensional user shoe shopping profile, hereinafter referred to as a user shopping avatar, may be created, by processing the various input data from steps 615, 620, 625, 630 and 635, thereby generating a user shoe shopping avatar or profile that includes user physical properties as well as user behavior and user preference data. In some embodiments, the user shoe shopping profile includes both feet of the user, which are typically different and for which parameters are determined individually, thereby benefitting from individual profiles for left and right feet.

At step 645 a matchmaking of the user shoe shopping profile to shoe products being examined, researched or required is executed. At this step, the product data including dimensions, from product databases 600, 605 and 610 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences. The step of matching may be complemented by a provision of recommendations for the user, based on the above profile to she matchmaking process. This step may use the models of the foot and shoe digital profiles directly, and/or the parametrized numeric model.

At step 650 product fitting data from feedback of physically present personnel or remote people may be used to help modify the matchmaking of user data to product data, for example, the feedback from a salesperson in a store may be used to update the user profile, or the feedback from remote people connected via a smart phone or computer for example. In some cases, for example, salesperson or friend feedback, such as which colors look good on a person or which size looks best etc. may be used by the user to update their shopping profile. In some cases, advanced graphic processing and 3D rendering may be used for the user to try on the product being researched, such that the user may see themselves virtually dressed in the product in accordance with a digital simulation that places the product onto the user shopping avatar. As above, the user may use the shopping Avatar to provider further feedback to modify the user's shopping profile. At step 655 feedback may be acquired from social networks to which a user is connected, to help modify the user shopping profile.

At step 660, a personalized pair of shoes may be ordered by a user, whether inside a physical store or in an online store. Further, a personalized product may be ordered from a manufacturer who may produce a product based upon the user's request such that the product is a once-off customized product for a user. Customized footwear based on this invention may be customized and/or personalized, for example, in of one or more of the following ways: shape (e.g., size, length, geometry, volume), design (e.g., colors, patterns, print, materials) or any other specification or combination of the above.

Figure 7:
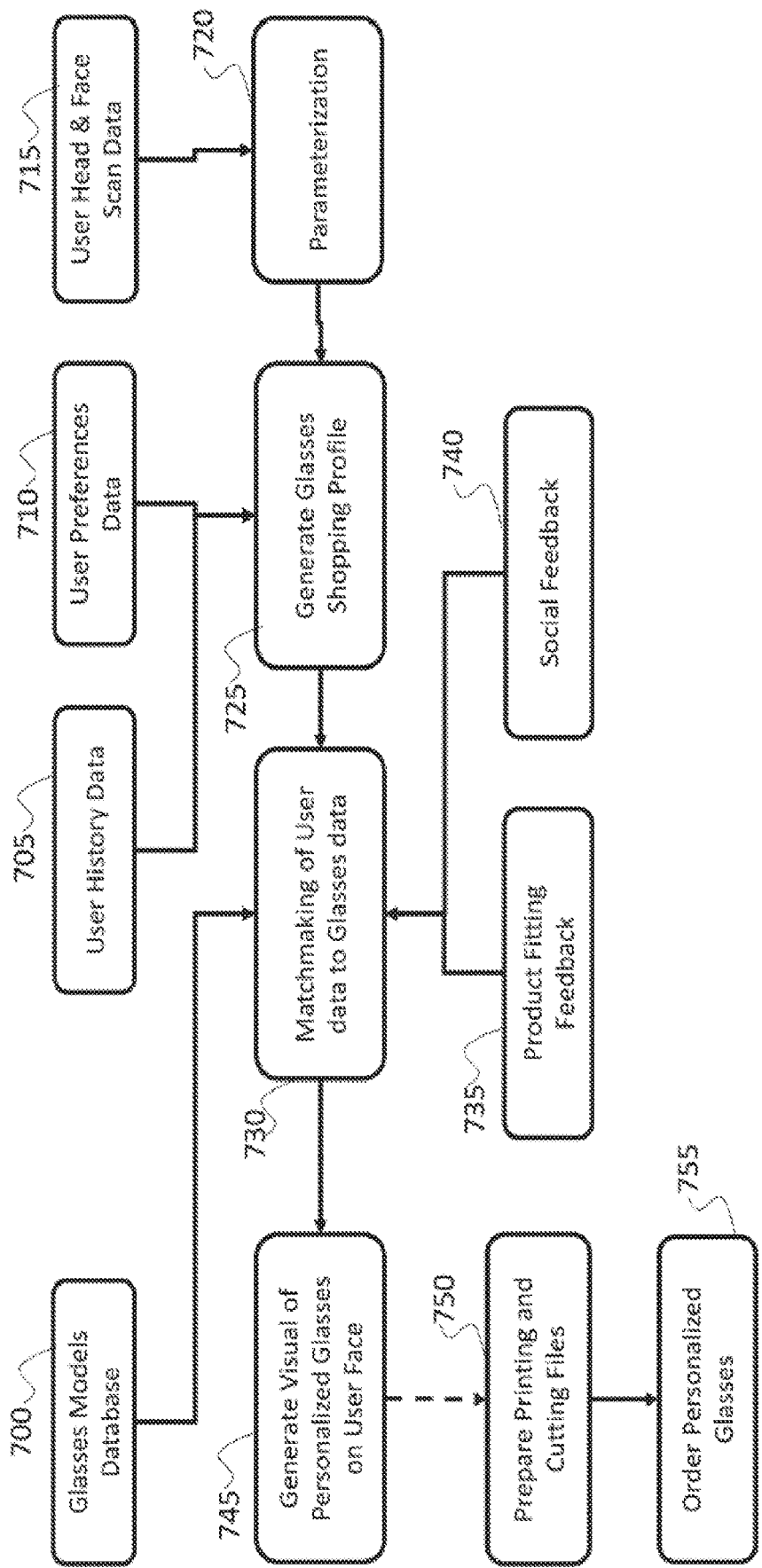
FIG. 7 is a flow diagram indicating an example of personalized eyewear shopping and manufacturing, online or offline, according to some embodiments.

Reference is now made to FIG. 7, which is a flow diagram indicating an example of personalized eyewear shopping and manufacturing, online or offline, according to some embodiments. This embodiment refers to both sun glasses and any type of optical glasses. As can be seen in the figure, glasses models information from glasses product database may be acquired at 700 from a glasses models or products database of various file types or data structures. According to some embodiments, glasses frame acquisition may be enabled by preparing parametric models, for example, by generating model parameters for multiple to input types, handling resolution adjustment, enabling automatic rigging and skinning, integrating range of motion animation and corrective shape-keys etc.

At step 705 history data for a user, for example including facial anatomical landmarks and measured distances such as inter popular distance, location of each eye, cheek, temple, and various points on the ear and the nose etc., may be used. The general parameters of each face are also loaded, optionally including the volume, proportions and standard shape, may be retrieved, for example, based upon previous user examinations and/or purchases in a store or chain of stores, whether from online and/or in store experiences. At step 710 user preference data may be acquired, such as size, color, material, type preferences, usage needs etc. This data may be acquired directly or indirectly, for example, using purchase information, questionnaires, forms and/or any other data acquisition method.

At step 715, scanned or graphic data may be acquired for a user, for example, from standard photographs, 2D and/or 3D image scanning etc. This includes, for example, any type of 3D scanning technology, as described in the above section or alternative 2D method using or not using reference objects for sizing. Typically, user head and face scan data may be acquired at this stage. In some embodiments, head and face model preparation and analysis may include model preparation such as smoothing and cleaning, rebuilding of the mesh with enhanced topology and/or optimized detail/weight ratio compression for optimal display in real-time, and/or orientation and alignment. Further, facial feature recognition may be used, for example, to generate a facial model rendered from multiple angles (e.g. 3 to 15 angles, to help determine Normal, Depth, Color). Moreover, computer vision and/or machine learning algorithms may be applied, for example, to identify the Eyes, nose, nose bridge, temples, ears etc. The processing of the scanned data may further include projection of 2D Landmarks to the 3D Model, and validation of anatomical landmarks. In the case of absent landmarks, an assessment based on statistic or empiric results may apply for replacement of these landmarks.

At step 720 the processed user scanned data may be parameterized, for example, to extract the precise face length, width, height, proportions, nose width and volume, ear size, ear height, ear position, skin color, and/or other relevant facial characteristics and dimensions etc. This data may be processed by the personalized shopping system at 725, together with the user history data from 705 and user preferences data at 715, to generate a user's glasses shopping profile based on the user's face profile and other physical properties, as well as user behavior and user preference data. In some embodiments, the user glasses shopping profile includes both eyes of the user, which are typically different, thereby benefitting from individual profiles for left and right eyes. In some embodiments, the optical prescription will be collected using a picture, an e-form, or an embedded testing method inside the application, or in some cases from external prescription files. According to some embodiments, the system may recommend specific models based on the face shape, previous purchases and history and optionally based on a comparison (optionally anonymous) to similar avatars.

At step 730 a matchmaking of the user glasses shopping profile to the glasses products being researched or required is executed. At this step, the product data from product database 700 is matched to products being researched by a user, in accordance to the specific user shopping profile, thereby enabling advanced filtering out of non-appropriate products for the specific user, and the advanced matching up of appropriate products, in accordance with the specific user's personal shopping profile and preferences.

At step 745, each frame is adjusted to fit on a user's face using frame Customization, that may include, for example: Taking key measurements on a subject or user's face; applying iterative comparison algorithms to adjust the frame to the face; digitally positioning the frame on the subject's face, orienting the frame appropriately to the face, scaling nose bridge size, width and position, adjusting arm folding, arm Length and pentoscopic tilt or angle, in accordance with the subject's face, as per the prepared user glasses shopping profile or avatar, etc.

At step 735 product fitting data from feedback of physically present personnel or remote people may be used to help modify the matchmaking of user data to product data, for example, the feedback from a salesperson or optometrist in a store may be used to update the user profile, or the feedback from remote people connected via a smart phone or computer for example. In some cases, for example, salesperson or friend feedback, such as which colors look good on a person or which size, style, type looks best etc. may be used by the user to update their shopping profile.

In some embodiments, at step 745, advanced graphic processing may be used for the user to virtually try on the product being researched, such that the user may see themselves dressed in the glasses in accordance with a digital simulation that places the glasses onto the user shopping avatar's face. The virtual try-on may, in some embodiments, include features such as physical simulation that positions the glasses at the correct or optimal position and can slide these along the nose. In addition, the try-on may include an overlay of a picture or 3D model on top of the face model/or a series of pictures or any combination of the above. Animated effects may be included to emphasize the different attributes of the glasses including customization animation in the case of custom frames, or other animation such as fly in/fly out animation for switching between pairs. As above, the user may use the shopping Avatar to provider further feedback to modify the user's shopping profile. In some embodiments, the user may view the customized frame on a digital version of his/her face, to provide profound visual feedback. For example, the user's face may be shown in a 3D viewer and the appearance may be enhanced, so as to provide one or more of 3D view manipulation (eg. zoom, rotation), and animated effects to compliment user experience, such as a breathing face, smile, blinking or other animated or static visual effects. Further, the user may thus be provided with customization options including choosing any frame from the collection, customizing the frame and lens colors, customizing an automatic recommended fit, personalization of a file (e.g. text, prescription etc.), and enabling side-by-side comparison between different frames. At step 740 feedback may be acquired from social networks or to which a user is connected, to help modify the user shopping profile.

Step 750 refers to an embodiment in which the system enables production of custom eyewear based on automated or semi-automated parametric design of the frame to fit the user. At step 750 relevant glasses production printing and cutting files may be prepared by the system, if necessary. In some embodiments, 3D printing files of standard forms for examples STL or OBJ and 2D lens cutting files such as DXF etc. may be prepared. In some embodiments, the system creates two or more pairs of models for each of the frame designs. This allows, for example, for a light weight model to be used for visualization purposes on the frontend of the application while maintaining a high-resolution model for the printing file preparation, that may include, for example, high resolution features and details, such as hinges, grooves, angles, ear pieces etc. The eyewear customization of print models described herein may be automatic and/or manual. Further, the file preparation for 3D printing may include automatically fixing of printability issues, generation of normal, duplicates, holes and non-manifold geometry etc. In some embodiments, the system may create custom tags on the glasses or eyewear, for example, including text, QR or barcode that would allow traceability throughout the production and distribution process.

At step 755, a personalized pair of glasses may be ordered by a user, whether inside a physical store or an online store. Further, a personalized product may be requested from the store, or ordered from a manufacturer who may produce a product based upon the user's request such that the product is a once-off customized product for a user.

According to certain embodiments, a system and process are described for automated personalized product ordering using a digital mirror or personalized viewing protocol. This embodiment may integrate virtual reality and/or augmented reality to manipulate, view and/or try on designated equipment such as existing or designed glasses, on a screen, table, smartphone, communications device etc., to allow visual representation of the custom or non-custom frames on the face of the client.

According to certain embodiments, a file format adapted to enable personalized product ordering is provided. This file format incorporates all of the relevant information, including physical properties and personal preference, to represent a user and help the user perform personalized custom or non-custom shopping for clothing, eyewear, footwear, or other body related products. This avatar standard format may be used to plugin into substantially any shopping platform, online or physical, to allow customization of the store to fit the physical and aesthetics needs and preferences of a customer.

Figure 8:
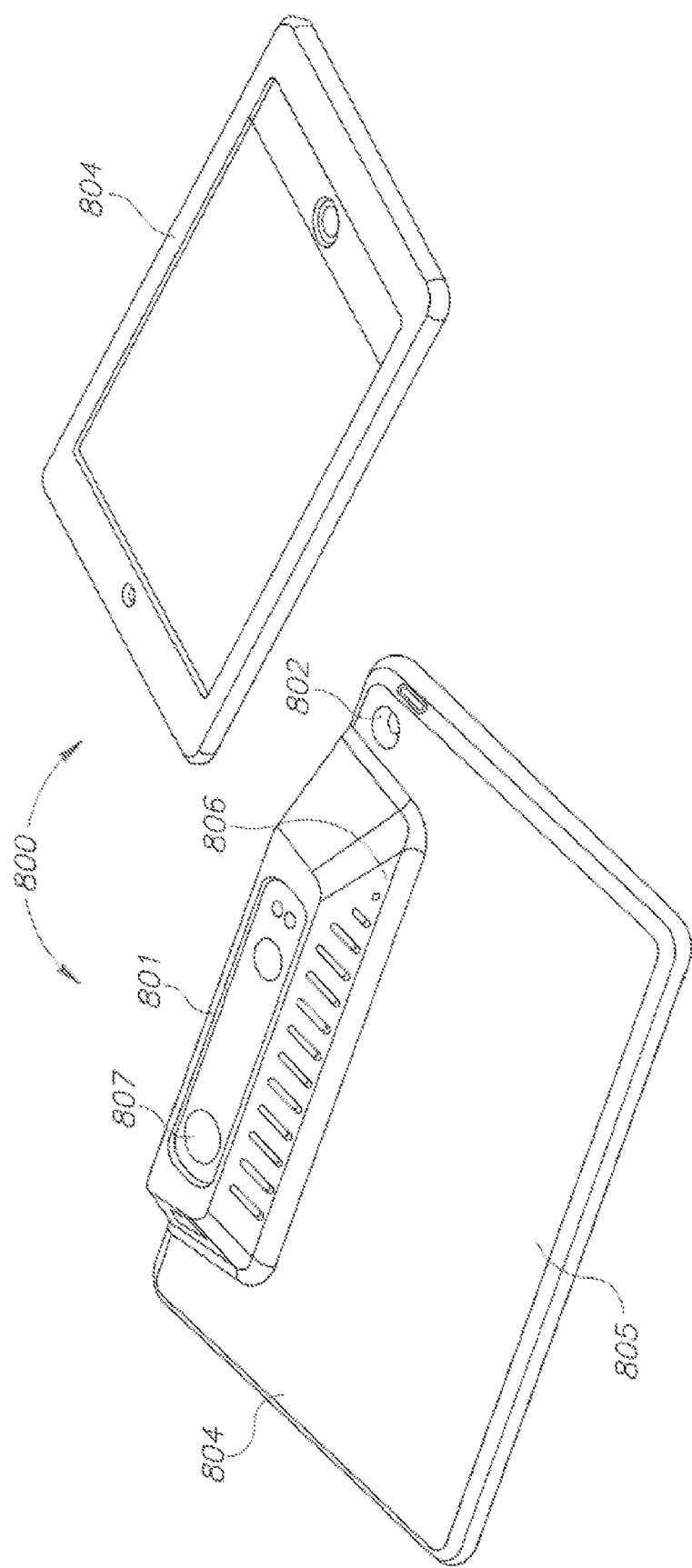
FIG. 8 shows a graphic from the front and back perspectives of an example of a hardware device including a 3D imaging module, according to some embodiments.

Reference is now made to FIG. 8, which shows a graphic from the front and back perspectives of an example of a hardware device including a 3D imaging module, according to some embodiments. As can be seen, a possible embodiment of the instore scanning unit 800 is shown. Unit 800 could be, in some embodiments, a hand-held device which may be used to enhance the shopping experience inside stores, such as shoe stores, glasses stores, and clothing stores, etc. In the current example, the device may include a tablet type screen and processor 804, such as iPad, Samsung Android tablet, Windows tablets or other similar units, phablet or smart communications device. A depth sensor 801 may be attached to the back of unit 800 to enable structured light, time-of-flight or other 3D scanning devices operating in IR/NIR or visual light conditions. In some embodiments, the depth sensor 801 is capable to provide a 3D scan of at least a part of a body that relates to an anatomical profile of a user, to enable capture of length, breadth and depth of the part of the body. Depth sensor 801 may also enable capture of additional or alternative anatomical or physical elements of the body or body part being scanned. In order to allow intense use of the scanning unit, cooling units 806 may be positioned on one or both sides of the scanning unit 800. The position of the scanning unit 800 is generally located relative to the position of the regular camera unit 802, which may be a derivative from the used processing tablet unit, such as the position of the camera on the back of an iPad mini version 4 in the case of the described embodiment. The case 805 may be fabricated from materials to allow protection of the unit in case of fall. This could be achieved using flexible materials such as silicone or polyurethanes, or by alternative design. The design of the casing 805 of the scanning handheld unit 800 may also include grip details or other elements 804 for better handling. An additional feature of the handheld scanning unit is the ability to stand on the face of the camera 807 when positioned on a counter or other surface, and creating a display that can be used for banners or other visual materials inside the store between uses. Additionally, when positioned on its back surface, the scanning unit 801 may create an angle which allows easy access to typing on an ergonomic angle.

Figure 9:
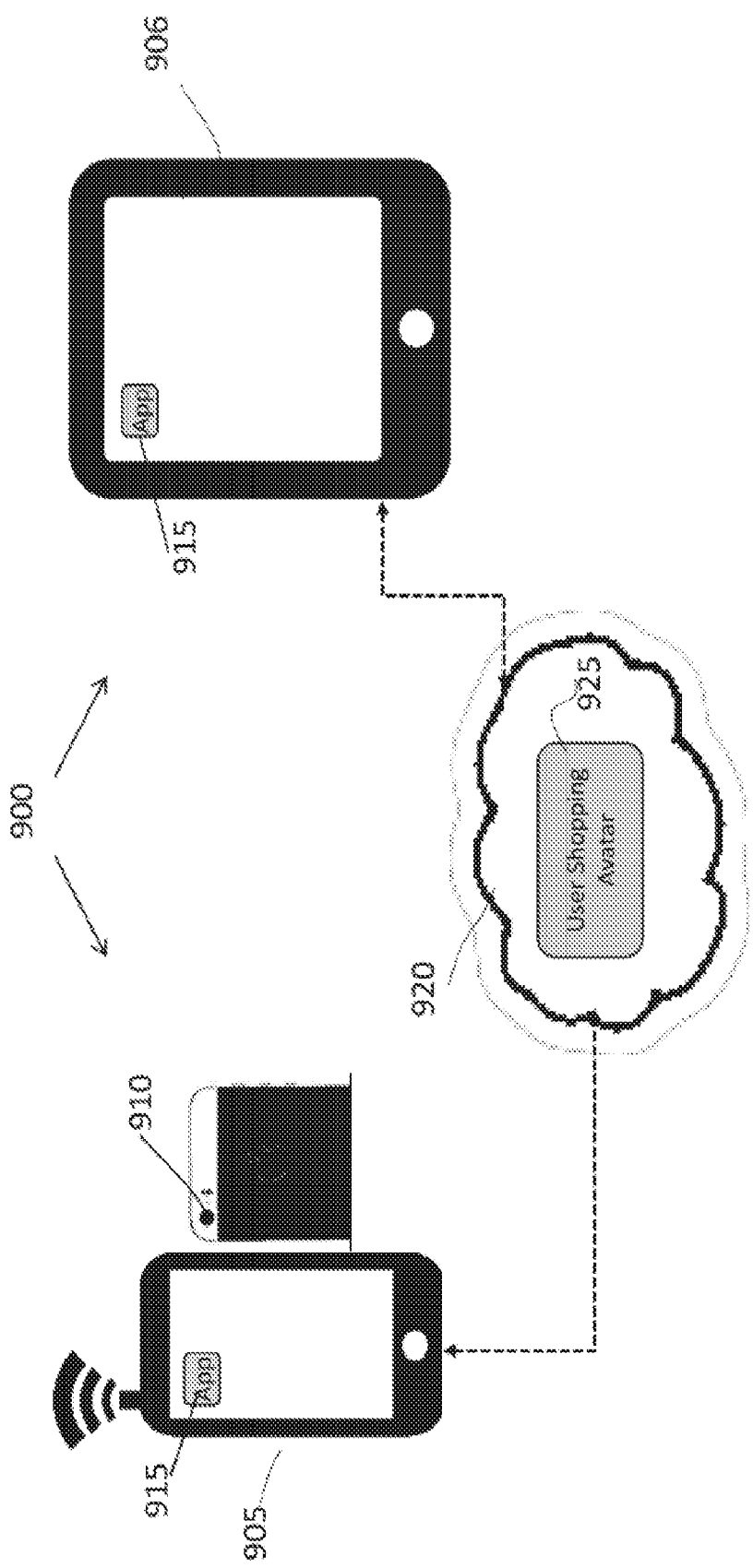
FIG. 9 shows a graphic from the front and back perspectives of an example of a remote user mobile device including an imaging module, according to some embodiments.

Reference is now made to FIG. 9, which shows a graphic from the front and back perspectives of an example of mobile scanning unit 900, for example, a remote user smart phone, tablet or other camera supporting mobile communications device 905, 906, according to some embodiments. As can be seen, communications devices 905, 906 could be, in some embodiments, a hand-held or wearable device. In the current example, the device may include a smart phone 905 or tablet type device 906, including a screen, processor, communications capability to enable communication with a communications cloud 920, and capability to run a software application 915 or code to generate a user mobile shopping avatar based on a scan or capture of at least a part of the user anatomy, and to facilitate personalized shopping. Device 905 typically includes one or more cameras 910, to enable capturing information about a person's foot or both feet optionally simultaneously using a standard picture/scan, video, series of pictures or advanced sensing components such as structured light, time-of-flight or others in IR/NIR or visual light conditions. Device 905 typically includes a gyrometer to provide camera orientation data to the device camera, for example, to only allow a picture to be taken when the camera is substantially flat. In some embodiments, internal sensing components and/or additional sensors may be attached to the communications device 905, 906 to supply supplementary data to the system. For example, such sensors may assist in improving accuracy of measurements, assisting the user during the capturing of the data with real-time feedback, and/or providing input to the calculation engine. Remote devices 905 and 906 may communicate with communications cloud 920, and in particular, may be connected to the device user's personalized shopping avatar or profile 925.

Figure 10:
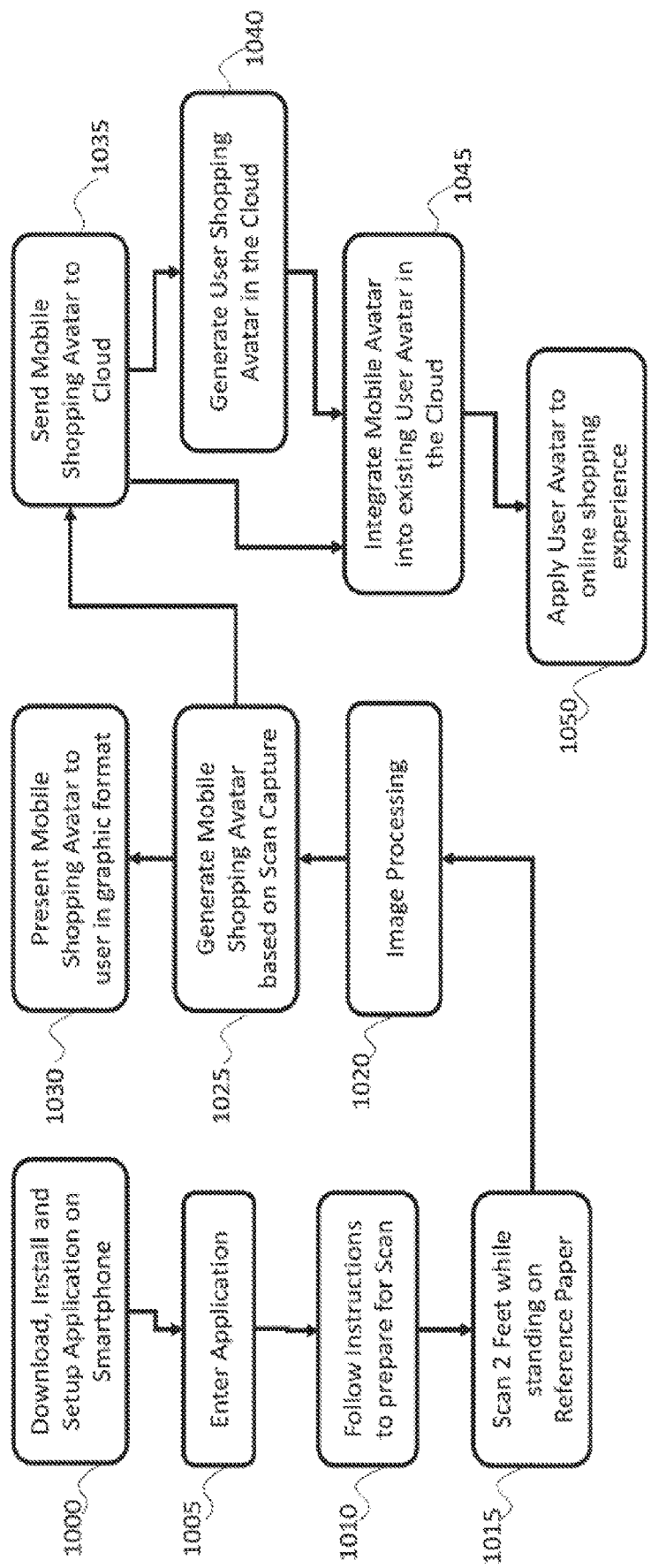
FIG. 10 is a flow diagram indicating an example of using a remote user communications device with a personalized shopping support application, according to some embodiments.

Reference is now made to FIG. 10, which is a flow diagram indicating an example of a personalized footwear shopping facilitation process, using a remote user communications or computing device with a camera, according to some embodiments. As can be seen in the figure, at step 1000 a remote user may download, install and setup a personalized shopping application 915, on their smartphone, tablet or other mobile communications device. In other embodiments, the software may run entirely on a web/cloud platform and operate remotely within the remote device. Application setup may include setting up one or more new user profiles or connecting to one or more existing profiles on the cloud. At step 1005 the user may enter or open the application. Using internal memory, cookies or other methods, the system may remember and recognize the user when using on the same device, bringing up the relevant information that has been collected and attached to his or her profile. At step 1010 the user may prepare for one or more the image captures or scans, optionally following Application instructions. For example, the application may provide graphic, video, audio or other guidelines for setting up and executing the scan. At step 1015 a scan may be executed. In the current example of a scan for personalized shoe shopping, the user may scan both feet simultaneously, wearing dark socks, while standing on a reference sheet of paper, and generally while standing with the back of the feet adjacent to a wall. The picture captured may generally be processed using machine vision or traditional image processing in order to recognize the feet, the wall and in some embodiments a reference object such as a sheet of (white) paper. In other embodiments, the user may use the system without wearing socks, or with any kind of socks, or reference object. The scanning of the feet from the camera allows the image processing to substantially define a digital shopping avatar of the user's feet, with all the required feet dimensions, based on the feet scan. Of course, similar functionality can be provided for other anatomical parts, or a whole body.

At step 1020 the scanned file is processed, either on the remote user communications device and/or in the communications cloud. This image processing may include extracting the body part(s) dimensions. In some embodiments, the image processing unit may use machine learning or deep learning technology to improve on the task of recognition. In some embodiments, a reference object may be used to allow this system to scale to a real-world proportion. In the embodiment, this reference is a sheet white paper of standard size, i.e. A4, letter or legal page. In other embodiments, this reference object could scale based on any standard coin, credit card, or other objects of known dimensions. This includes known proportions that can be used within a person's anatomy. The system may use the reference object, optionally together with data from additional sensors, to calculate the precise or exact position relative to the scanned object at any given time or in any given frame. In the current example, image processing algorithms may include code or script to identify the size of the reference paper (e.g., A4, letterhead etc., based on relative length and width etc.), the front most point, the left most point, and right most point for each foot. Further the code or script may identify the height of the foot, thickness of the foot, any obvious abnormalities etc. Additionally, the code or script may identify the shadow, and thereafter to substantially remove the shadow. In some embodiments, the application may automatically create a flash or other means in the image capture, to aid shadow minimization. At step 1025 the Application enables generation of a personalized shopping avatar representing the scanned anatomy or body part(s), based on the scan performed. The avatar generation may include in some embodiments constructing a graphic image or simulation of the scanned anatomy. For example, a 3D representation of a scanned foot may be constructed. At step 1030 the application may present the personalized (mobile) shopping avatar to the user, optionally in graphic format, using the Application UI. In some embodiments, the avatar may be presented in 360 degrees using a GIF animation containing a series of angles and/or using real-time 3D rendering, for example, to enable pan, zoom and rotation of the object on a screen.

At step 1035 the personalized shopping avatar may be sent to the communications cloud, form the remote user communications device. At step 1040, in the case where there is no existing user personalized shopping avatar in the cloud, the personalized user shopping avatar is generated in the cloud, based on the user mobile shopping avatar. At step 1045, in the case where a personalized user shopping avatar exists in the cloud, the mobile generated avatar may be integrated in the existing user avatar in the cloud. At step 1050 the personalized user avatar may be applied to an online shopping experience. In further embodiments, the personalized user avatar may be applied to an in-shop shopping experience, or hybrid shopping experience.

According to some embodiments, at step 1000, a user may be requested to enter a class or category to help guide the application in providing capture instructions, image processing and/or personalized shopping avatar generation. For example, for feet profile capture, a user may be requested to define if they are male or female, adult or kid etc. In some embodiments, for example, where a personalized user profile exists, the user may not need to re-enter such information.

According to some embodiments, at step 1010, when following instructions to prepare for a scan, the application may enable a pre-scan check, for example, of the reference paper, standing position, lighting in the location being captured etc., to determine if one or more of these aspects are problematic, and if so, to suggest changing one or more of these aspects. For example, the camera may automatically capture the information using one or more time-frames when the image is perfect, in focus and/or optimized, optionally based on real-time processing, for creating an accurate and optionally real-life representation of at least a part of the body anatomy.

According to some embodiments, at step 1010, the application may block image capture until an adequate capture is determined. For example, the mobile device may use its internal gyrometer or accelerometer to determine the flatness of the camera, and only allow the camera to take a picture if the camera is substantially flat. In further embodiments, the application may automatically control imaging related functions, such as flash etc.

According to some embodiments, at step 1020, basic image processing may enable 2-4 basic feet parameters to be extracted from a feet scan. Depending on the imaging device, device processor, shopping need etc., additional and/or alternative anatomy parameters may be extracted and/or generated. In some examples, where a depth image capture is enabled on the device, the list of parameters that may be extracted or derived may include one or more of: volume of the foot (or feet), circumference measurements at various locations, identifying pronation or supination and optionally the level of severity, proportions, different lengths and width measurements, and more.

According to some embodiments, at step 1020, after initial image processing, if it is determined that the capture is not satisfactory, the application may instruct the user to re-scan, to try to acquire an adequate capture.

According to some embodiments, at step 1020, after initial image processing, if it is determined that the capture is not satisfactory, the application may enable the user to manually execute one more steps in the capture, for example, to allow the user to drag and orient the image frame, crop the image, etc.

According to some embodiments, at step 1045, when integrating a mobile generated personalized shopping avatar to an existing avatar, the mobile generated avatar may be used to update, upgrade, improve and/or add to the existing user profile. For example, a cloud based version of a user shopping avatar may include a feet avatar for the user from 1 year ago, and for a growing user, the feet size has now changed, so the existing user feet avatar may be replaced by the new mobile generated feet avatar, representing updated data. In an additional embodiment, the scan may be updated according to expected growth curves inserted into the system or calculated by the system, optionally from comparing to other scans over time, or using external data. In a further example, a user profile may include a head profile, for example, for glasses shopping, and may not include a feet profile. In such a case, the feet profile may be added to the user shopping profile, as being connected to the same user. In turn, many anatomy profiles can be added to the user profile to help generate a full body profile for assisting personalized shopping, for example, for footwear, glasses, clothes, accessories etc. In still further embodiments, machine learning may be applied, to independently learn from user behavior, images, shopping history, existing wardrobe, etc., to improve the user shopping profile.

In accordance with some embodiments, mobile and/or user avatars may be shared with other users. For example, a user may have access to or control multiple user profiles, with the users' authorization, for example, in a wallet or holder of avatars or profiles. In such a case, the controlling user may shop on behalf of other users. For example, a parent may keep the profiles of all their family members, allowing the parent to easily shop online and/or offline for all the associated family members.

In accordance with some embodiments, additional personalization can be provided for each personalized user shopping avatar, such as an icon or picture. Such personalization may be particularly useful for a controlling user to manage multiple users or personalized shopping avatars. This information associated with any identifier may be saved on the cloud avatar database and associated with a user in any platform that s/he uses. For example, in the case where a family member scans and saves one or more of his or her family members profiles, these may be shared with another family member(s) who can now load them into an in-store system or a ecommerce website being used, and subsequently use this personalized information. In the case of a website, the output may be personalized in accordance to this personalized data and may even include the other user's picture or avatar or 3D model right next to the information provided, to reassure the user's confidence that the recommendations are personal and based on his or her profile, or other profiles being legitimately used by the user.

In accordance with some embodiments, an online store may include a user shopping virtual assistant, using a profile plug in or other digital object, that may appear on substantially any webpage (whether optimized for mobile phone, desktop, notebook, tablet, wearable etc.), when relevant, to offer recommendations, guidelines or other assistance to the user. For example, the virtual shopping assistant may show information about different fits for the user profile being used, or otherwise assist the user. For example, a user with a foot size of 41 European, while shopping or browsing in the Nike online store, may be informed that the equivalent size for their feet profile in Nike shoes is 42 European or US size 10.5. Additionally, if the user profile includes preference data, such as preferred colors and fits etc. the shopping virtual assistant may also provide suggestions or guidelines based on the user preferences. For example, in the Nike shoes store, the shopping assistant may suggest to the user to look for options that are 10.5 American size, in athletics shoes, in either blue or green, etc.

In some embodiments, the virtual assistant may take the user directly to a page or pages that match the user shopping profile data and preferences. In one embodiment, the profile may direct the website into the sections that are interesting or relevant to a specific user while avoiding irrelevant pages. In another embodiments, the system may use the personalized information, alone or in aggregate with additional users, to rearrange the website and create a personalized version of the website that may represent what s/he may be most interested in and what would best fit for him or her.

In accordance with some embodiments, the virtual shopping assistant may enable rendering of 3D views of a product being viewed, and optionally of a personalized product. For example, a custom shoe being viewed in accordance with a user's shopping profile may be rendered in 3D from all sides and angles, to assist the user is viewing the product from multiple dimensions.

In accordance with some embodiments, a virtual fitting module may be provided, to allow dressing of the shopping avatar with the product(s) being viewed.

In accordance with some embodiments, a personalized user shopping avatar may be a once off avatar for a store. In other embodiments, the user shopping avatar may be applicable to a chain of stores. In other embodiments, the user shopping avatar may be applicable to a variety of brands or stores, for example, all owned by a parent entity. In other embodiments, the user shopping avatar may be applicable to any or all stores, via connecting to the universal user profile in the cloud.

Figure 11C:
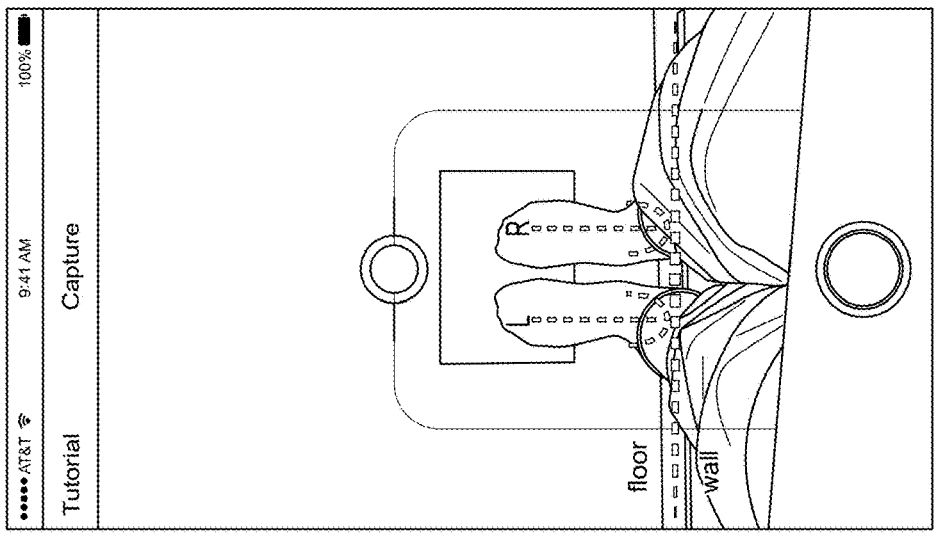
FIGS. 11A-11C are GUIs showing examples of screenshots for initiating a capture of a feet profile, according to some embodiments.
Figure 11B:
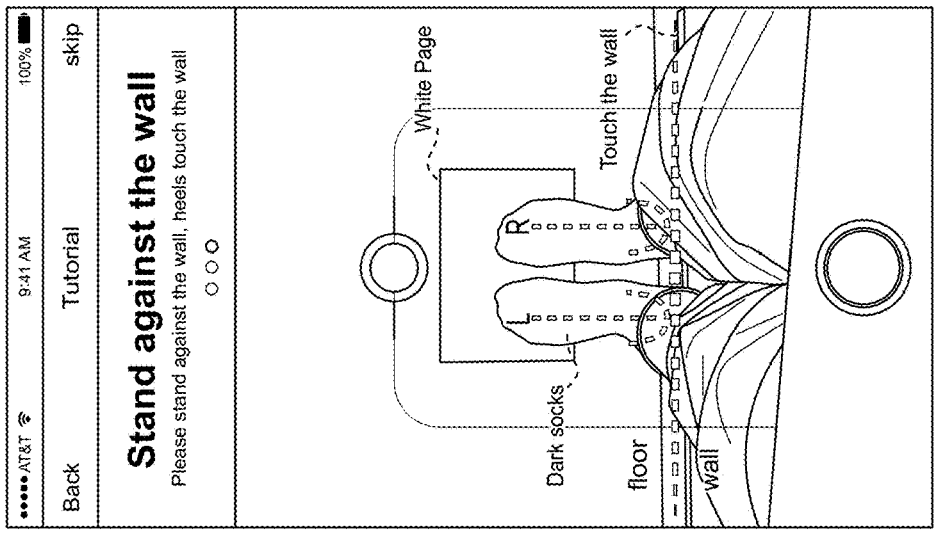
Figure 11A:
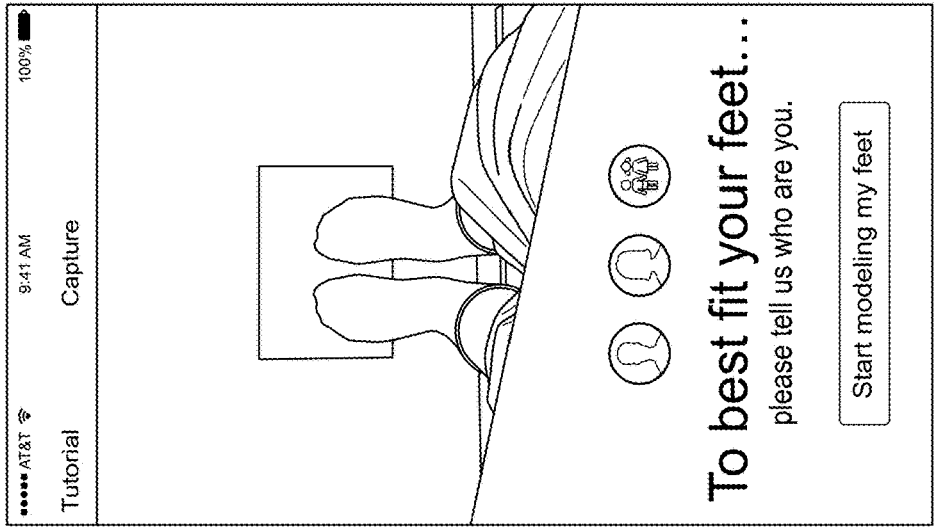

Reference is now made to FIGS. 11A-11C, which are GUIs showing examples of screenshots for initiating a capture of a feet profile, according to some embodiments. As can be seen in FIG. 11A, a welcome screen may be presented to the user of the Application, to suggest setting up a basic user profile or going ahead to start the feet modeling process. In FIG. 11B, an example is provided of a GUI presenting a tutorial to guide the user. The example shown indicates in an image an example how the user should stand, optionally with several screens of instructions. In FIG. 11C, an example of a capture screen is provided, showing elements of the capture superimposed over the camera image sensor. The circle element in the middle of the screen may, for example, indicate when the scan is ready to be captured. For example, the mid circle may be green when ready to capture, and red when not ready. In some embodiments, the capture may be taken automatically by the device when ready. In FIG. 12A, a screen showing manual manipulation is shown, allowing for the user to adjust the lines, drag the margins of the image etc.

Figure 12C:
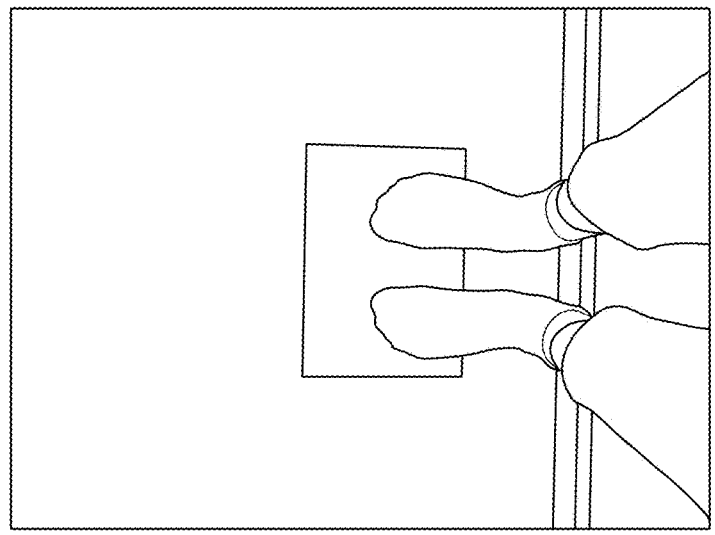
FIGS. 12A-12C are examples of screenshots for showing a capture of a feet profile, according to some embodiments.
Figure 12B:
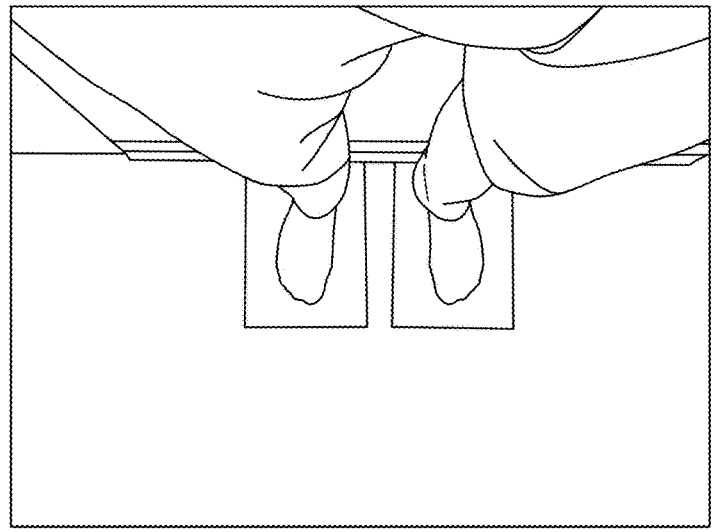
Figure 12A:
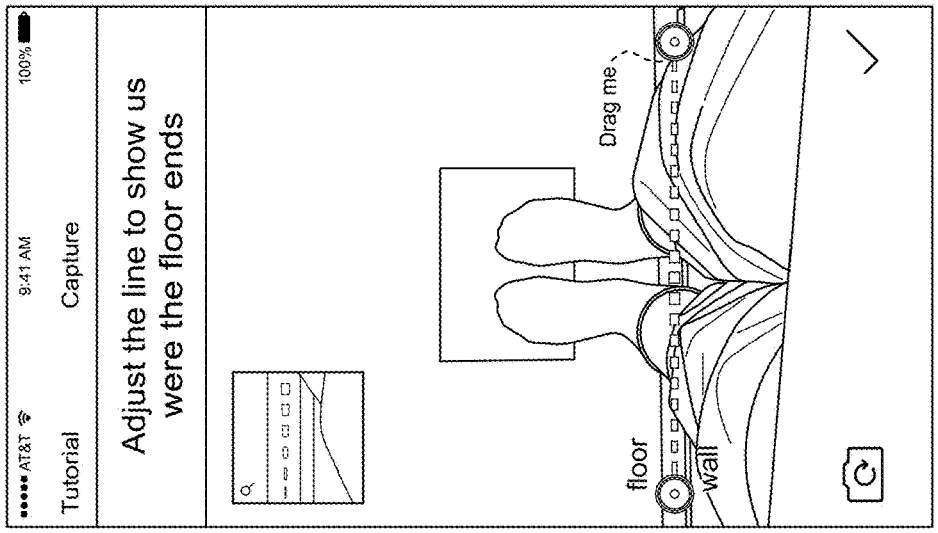

Reference is now made to FIGS. 12A-12C, which are examples of screenshots for showing a capture of a feet profile, according to some embodiments. As can be seen in FIG. 12B, an image from the user's perspective is shown, where each foot is on a separate reference sheet of paper. As can be seen in FIG. 12C, an image from the user's perspective is shown, where both feet are placed on the same reference sheet of paper. Ad can also be seen, black socks are being worn, and the user is standing against a wall, as suggested above.

Figure 13C:
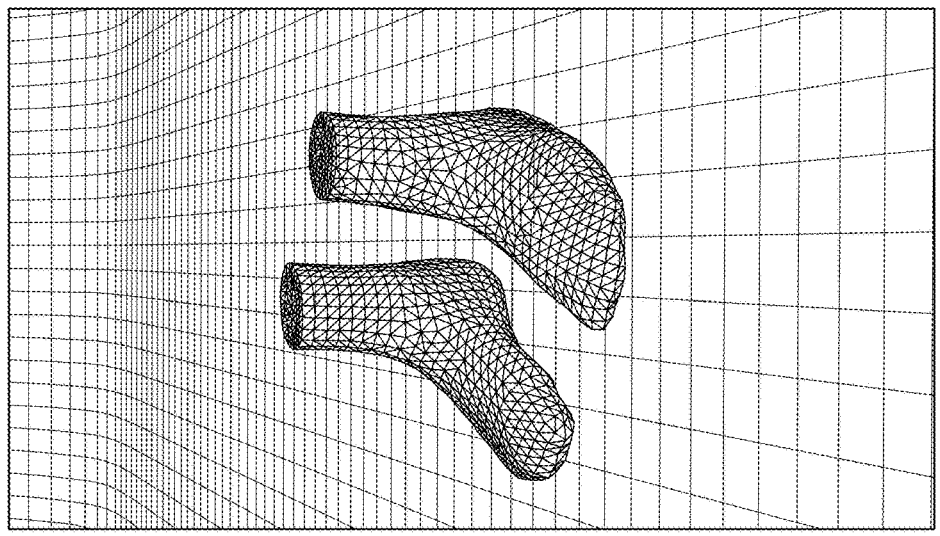
FIGS. 13A-13C are GUIs showing examples of screenshots for assisting fee avatar generation, according to some embodiments.
Figure 13B:
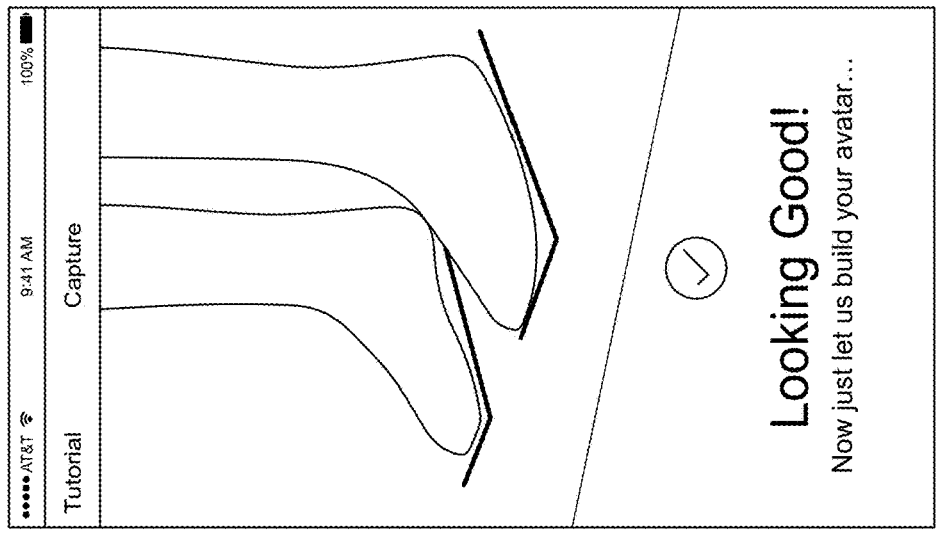
Figure 13A:
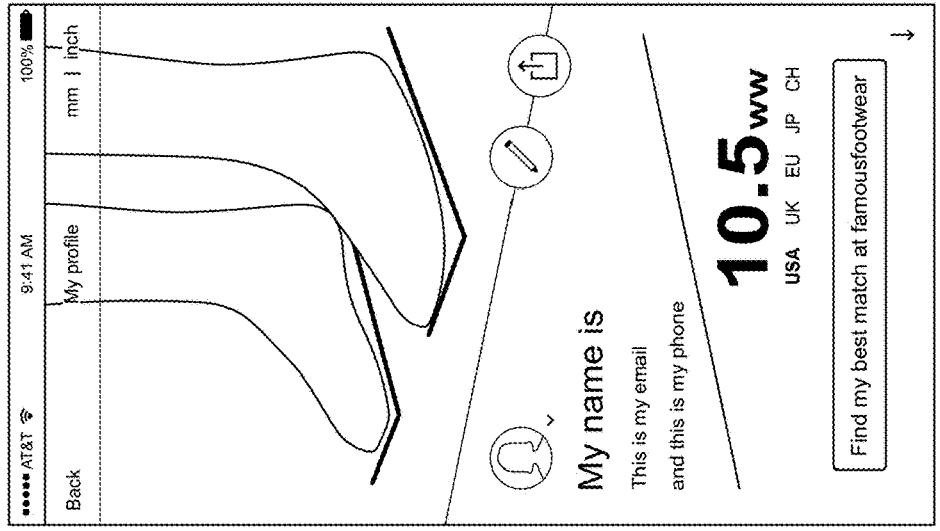

Reference is now made to FIGS. 13A-13C, which are GUIs showing examples of screenshots for assisting fee avatar generation, according to some embodiments. As can be seen in FIG. 13A an introductory screen is shown that suggests to the user to enter basic user data and preferences [[Is this before or after initial measurement?]]. As can be seen in FIG. 13B a screen is shown that verifies that the scan was accepted, at least initially, and that the Application will now build the avatar. As can be seen in FIG. 13C, a screen is shown that presents the user with a generic, personalized, simulated or other rendition of the feet mobile profile. In some embodiments, a 3D profile may be generated on the screen.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:
1. A method comprising:
acquiring anatomical data of a user using a personalized shopping assistant application on a mobile computing device, wherein, the mobile computing device is configured to capture anatomical data by:
displaying markings on a display of the mobile computing device to guide the user to stand appropriately to allow an accurate scan of a part of a user's body with respect to a reference object;
automatically obtaining an image of the part of the user's body using a 3D scanner on an imaging module attached to or integrated with a back portion of the mobile computing device, wherein the 3D scanner is configured to scan the part of the user's body, and wherein the image includes multidimensional geometrical data of the scanned part of the user's body;
processing the image to automatically identify one or more features of the part of the user's body using machine vision; and
calculating, based on the processed image and with respect to the reference object and the mobile computing device, user body measurement data of the part of the user's body;

generating, based on the user body measurement data, a personalized user shopping avatar based on generating a model of the part of the user's body, wherein the personalized user shopping avatar comprises the user body measurement data and user behavior data;

accessing, using the personalized shopping assistant application, product data from one or more product data sources;

generating at least one product recommendation based on matching one or more products from the one or more product data sources to the personalized user shopping avatar;

interactively presenting, on the display of the mobile computing device and using the personalized shopping assistant application, one or more matched products worn on the personalized user shopping avatar;

transmitting a prompt to a remote computing device associated with a sales associate at a point of sale to provide feedback in connection with the one or more matched products worn on the personalized user shopping avatar;

receiving, from the remote computing device associated with the sales associate, feedback relating to the one or more matched products worn on the personalized user shopping avatar; and upon receiving the feedback, automatically generating an updated interactive presentation of the personalized user shopping avatar and one or more modified product recommendations in accordance with the feedback.

2. The method of claim 1, further comprising accessing user history data.

3. The method of claim 1, further comprising accessing user preference data.

4. The method of claim 1, further comprising providing a simulation that represents one or more anatomical characteristics of the user.

5. The method of claim 1, further comprising simulating one or more products on at least a part of the personalized user shopping avatar in the personalized shopping assistant application.

6. The method of claim 1, further comprising interactively presenting modifications to at least one product recommendation based on the feedback.

7. The method of claim 1, further comprising ordering a customized product.

8. The method of claim 1, further comprising providing a product matching feedback from a social network.

9. The method of claim 1, further comprising generating a virtual simulation of one or more products based on the personalized user shopping avatar and based on additional personalized shopping avatars of other users sharing common features with the personalized user shopping avatar.

10. The method of claim 1, further comprising modifying the personalized user shopping avatar in accordance with changes in one or more of user anatomical information, user anatomy data, user behavior, user history, user preferences, and social feedback.

11. The method of claim 10, wherein the user preferences include at least one of: size, color, style, price, material, or type preferences.

12. The method of claim 1 wherein the personalized user shopping avatar comprises a 3D model of the part of the user's body.

13. A platform for personalized shopping, comprising:
a cloud based server including a profile module configured to generate a personalized shopping avatar based at least partially on anatomical profile data for multiple users, a product module configured to consolidate product data for multiple products, and a product matching module configured to match one or more products to one or more shopping avatars; and a personalized shopping assistant application running on a mobile computing device, wherein the mobile computing device includes an imaging module attached to or integrated with a back portion of the mobile computing device, wherein the imaging module includes a 3D scanner configured to scan at least a part of a user's body and to enable anatomical profile data capture of a user to be used by the profile module to generate a personalized shopping avatar for the user;

wherein the mobile computing device is communicatively connected to the cloud based server;

wherein image capture data and anatomical profile data are communicated to the cloud based server;

wherein the personalized shopping assistant application is configured to capture anatomical profile data of the user by:
displaying markings on a display of the mobile computing device to guide the user to stand appropriately to allow an accurate scan of a part of a user's body with respect to a reference object;

automatically obtaining an image of the part of the user's body when the part is within the markings using the 3D scanner to scan the part of the user's body, wherein the image includes multidimensional anatomical data of the scanned part of the user's body;

processing the image using machine vision to automatically identify one or more features of the part of the user's body;

calculating, based on the processed image and with respect to the reference object and the mobile computing device, user body measurement data of the part of the user's body; and generating the personalized shopping avatar based on generating a model of the part of the user's body, wherein the personalized shopping avatar comprises the user body measurement data and user behavior data;

wherein the product matching module is configured to match one or more products to the personalized shopping avatar by:
matching one or more products from the consolidated product data to the user body measurement data and the user behavior data of the personalized shopping avatar, and wherein the personalized shopping assistant application is further configured to:
interactively presenting, on the display of the mobile computing device and using the personalized shopping assistant application, one or more matched products worn on the personalized shopping avatar;

transmitting a prompt to a remote computing device associated with a sales associate at a point of sale to provide feedback in connection with the one or more matched products worn on the personalized shopping avatar;

receiving, from the remote computing device, feedback relating to the one or more matched products worn on the personalized shopping avatar; and upon receiving the feedback, generating an updated interactive presentation of the personalized shopping avatar and one or more modified product recommendations in accordance with the feedback.

14. The platform of claim 13, wherein the personalized shopping assistant application further includes a personalized product ordering module configured to generate personalized product recommendations.

15. The platform of claim 13, wherein the personalized shopping assistant application further includes a product customization module configured to dress one or more products on the personalized shopping avatar.

16. The platform of claim 13, wherein the personalized shopping assistant application further includes a social shopping module.

17. The platform of claim 13, wherein the personalized shopping assistant application further includes a personalized product fitting module.

18. A mobile device comprising:
 a touch screen configured to receive a user's input;
 an imaging module that is attached to or integrated with a back portion of the mobile device, the imaging module including a 3D image scanner configured to capture one or more images of at least a part of a user anatomy, wherein the one or more images include multidimensional geometrical data of the at least a part of the user anatomy;
 a processor having registers adapted to:
  display markings on a display of the mobile device to guide a user to stand appropriately to allow an accurate scan of the part of the user anatomy with respect to a reference object;
  automatically obtain an image of the part of the user anatomy using the 3D scanner to scan the part of the user anatomy;
  process the image using machine vision to automatically identify one or more features of the part of the user anatomy;
  calculate, based on the processed image and with respect to the reference object and the 3D image scanner, user body measurement data of the part of the user anatomy; and
  generate, based on the user body measurement data, a model of the part of the user anatomy, wherein the model comprises the user body measurement data; and
 a software application running on the mobile device and configured to generate a graphic simulation of a personalized user shopping avatar based on the model of the part of the user anatomy and based on user behavior data,
 wherein the processor is configured to retrieve information from the registers, and to write information to the registers, and wherein the processor is configured to:
  match the user body measurement data and the user behavior data of the personalized user shopping avatar with external product data to generate a personalized product offering;
  interactively present, on the display of the mobile device, the personalized product offering being worn on the personalized user shopping avatar;
  transmit a prompt to a remote computing device associated with a sales associate at a point of sale to provide feedback in connection with the personalized product offering worn on the personalized user shopping avatar;
  receive, from the remote computing device, feedback relating to the personalized product offering worn on the personalized user shopping avatar;
  modify one or more aspects of the personalized product offering based on the feedback; and
  upon receiving the feedback, generate an updated interactive presentation of the personalized user shopping avatar and a modified personalized product offering in accordance with the feedback.

19. The mobile device of claim 18, further comprising registers adapted to analyze one or more user history data and user preference data, and wherein the software application running on the mobile device is further configured to receive additional the one or more user history data and user preference data to cause a modification to the personalized user shopping avatar.

20. The mobile device of claim 18, further comprising a depth sensor configured to provide 3D data that enables enhanced generation of a user anatomical profile for the model of the part of the user anatomy.

* * * * *

UNITED STATES PATENT AND TRADEMARK OFFICE
CERTIFICATE OF CORRECTION

| | | |
|---|---|---|
| PATENT NO. | : 12,131,371 B2 | Page 1 of 1 |
| APPLICATION NO. | : 16/329355 | |
| DATED | : October 29, 2024 | |
| INVENTOR(S) | : Bleicher et al. | |

It is certified that error appears in the above-identified patent and that said Letters Patent is hereby corrected as shown below:

On the Title Page

Page 3, Column 1, Foreign Patent Documents, Line 16:
Delete "106149376" and insert --H06149376--

Signed and Sealed this
Tenth Day of June, 2025

Coke Morgan Stewart
*Acting Director of the United States Patent and Trademark Office*